(12) United States Patent
Miller et al.

(10) Patent No.: US 11,907,493 B2
(45) Date of Patent: *Feb. 20, 2024

(54) SYSTEM AND METHOD FOR INTERACTIVE APPLICATION PREVIEW

(71) Applicant: LIVEPERSON, INC., New York, NY (US)

(72) Inventors: Grant Lawrence Miller, Los Angeles, CA (US); Marc Campbell, Los Angeles, CA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,385

(22) Filed: Jun. 13, 2022

(65) Prior Publication Data

US 2023/0021745 A1 Jan. 26, 2023

Related U.S. Application Data

(63) Continuation of application No. 17/130,268, filed on Dec. 22, 2020, now Pat. No. 11,397,505, which is a continuation of application No. 14/883,946, filed on Oct. 15, 2015, now Pat. No. 10,908,760.

(60) Provisional application No. 62/064,254, filed on Oct. 15, 2014.

(51) Int. Cl.
| | |
|---|---|
| *G06F 3/0481* | (2022.01) |
| *G06F 3/048* | (2013.01) |
| *G06F 40/143* | (2020.01) |
| *G06F 9/451* | (2018.01) |

(Continued)

(52) U.S. Cl.
CPC ............ *G06F 3/0481* (2013.01); *G06F 3/048* (2013.01); *G06F 40/143* (2020.01); *G06F 3/04847* (2013.01); *G06F 9/453* (2018.02); *H04L 67/02* (2013.01)

(58) Field of Classification Search
CPC ............. G06F 17/2247; G06F 17/2288; G06F 3/0481; G06F 3/048; G06F 3/04847; G06F 9/453; H04L 67/02; H04L 41/082
See application file for complete search history.

(56) References Cited

U.S. PATENT DOCUMENTS

| | | | |
|---|---|---|---|
| 8,307,283 B1 | 11/2012 | O'Neill | |
| 8,799,463 B1 * | 8/2014 | Svedloff | ............... G06F 16/972 709/225 |
| 8,843,851 B1 | 9/2014 | Gotchy | |

(Continued)

OTHER PUBLICATIONS

PC Magazine, "Definition of: maximize", (May 10, 2013), URL: https://www.pcmag.com/encyclopedia/term/46636/maximize, p. 1 (Year: 2013).

(Continued)

*Primary Examiner* — Mong-Shune Chung
(74) *Attorney, Agent, or Firm* — POLSINELLI LLP

(57) ABSTRACT

An interactive demonstration application can be used to test and experience the use of overlay elements (e.g., application add-ons, such as an interactive chat overlay) on a graphical interface (e.g., of a website or a computer application) before fully integrating the overlay elements into the graphical interface. The interactive demonstration application can also be used to demonstrate and update the live settings of a live overlay element used on a live webpage.

20 Claims, 29 Drawing Sheets

(51) Int. Cl.
G06F 3/04847 (2022.01)
H04L 67/02 (2022.01)

(56) References Cited

U.S. PATENT DOCUMENTS

| | | | |
|---|---|---|---|
| 10,908,760 B2 | 2/2021 | Miller et al. | |
| 11,397,505 B2 | 7/2022 | Miller et al. | |
| 2003/0083789 A1 | 5/2003 | Kalley | |
| 2004/0268225 A1 | 12/2004 | Walsh | |
| 2005/0188007 A1 | 8/2005 | Warner | |
| 2007/0245249 A1 | 10/2007 | Weisberg | |
| 2008/0052377 A1 | 2/2008 | Light | |
| 2008/0222533 A1 | 9/2008 | Hankejh | |
| 2008/0307413 A1 | 12/2008 | Ferris et al. | |
| 2009/0044114 A1 | 2/2009 | Ames | |
| 2009/0249221 A1 | 10/2009 | Weisbart | |
| 2010/0042573 A1 | 2/2010 | Wenig | |
| 2010/0250478 A1 | 9/2010 | Chen | |
| 2010/0279266 A1 | 11/2010 | Laine | |
| 2012/0005187 A1* | 1/2012 | Chavanne | G06F 16/958 707/711 |
| 2012/0311724 A1 | 12/2012 | Mahan | |
| 2013/0069781 A1 | 3/2013 | Terwilliger | |
| 2013/0144661 A1 | 6/2013 | Turley | |
| 2013/0167044 A1 | 6/2013 | Graves | |
| 2013/0174015 A1* | 7/2013 | Jeff | G06F 16/958 715/234 |
| 2013/0265225 A1* | 10/2013 | Nasiri | G06F 3/0346 345/156 |
| 2014/0022328 A1 | 1/2014 | Gechter | |
| 2014/0053060 A1* | 2/2014 | Walker | G06F 16/958 715/234 |
| 2014/0119531 A1 | 5/2014 | Tuchman | |
| 2014/0240440 A1 | 8/2014 | Seo | |
| 2014/0245141 A1 | 8/2014 | Yeh et al. | |
| 2014/0267363 A1 | 9/2014 | Kocienda | |
| 2015/0149935 A1* | 5/2015 | McNee | G06F 16/958 715/760 |
| 2015/0235240 A1 | 8/2015 | Chang | |
| 2015/0310377 A1 | 10/2015 | Schlumberger | |
| 2016/0071179 A1 | 3/2016 | Babcock | |
| 2016/0246473 A1* | 8/2016 | Jobs | G06F 3/04886 |
| 2016/0259509 A1* | 9/2016 | Alexander | H04L 61/50 |

OTHER PUBLICATIONS

International Search Report and Written Opinion of the International Searching Authority for PCT Application No. PCT/US2015/055748, dated Feb. 12, 2016, 11 pages.
Notice of Allowance dated Sep. 28, 2020 for U.S. Appl. No. 14/883,946; 8 pages.
Non-Final Office Action dated Oct. 14, 2017 for U.S. Appl. No. 14/883,946; 17 pages.
Final Office Action dated Jun. 6, 2018 for U.S. Appl. No. 14/883,946; 12 pages.
Non-Final Office Action dated Apr. 26, 2019 for U.S. Appl. No. 14/883,946; 18 pages.
Final Office Action dated Feb. 21, 2020 for U.S. Appl. No. 14/883,946; 14 pages.
Non-Final Office Action dated Nov. 5, 2021 for U.S. Appl. No. 17/130,268; 10 pages.
Notice of Allowance dated Mar. 16, 2022 for U.S. Appl. No. 17/130,268; 5 pages.

* cited by examiner

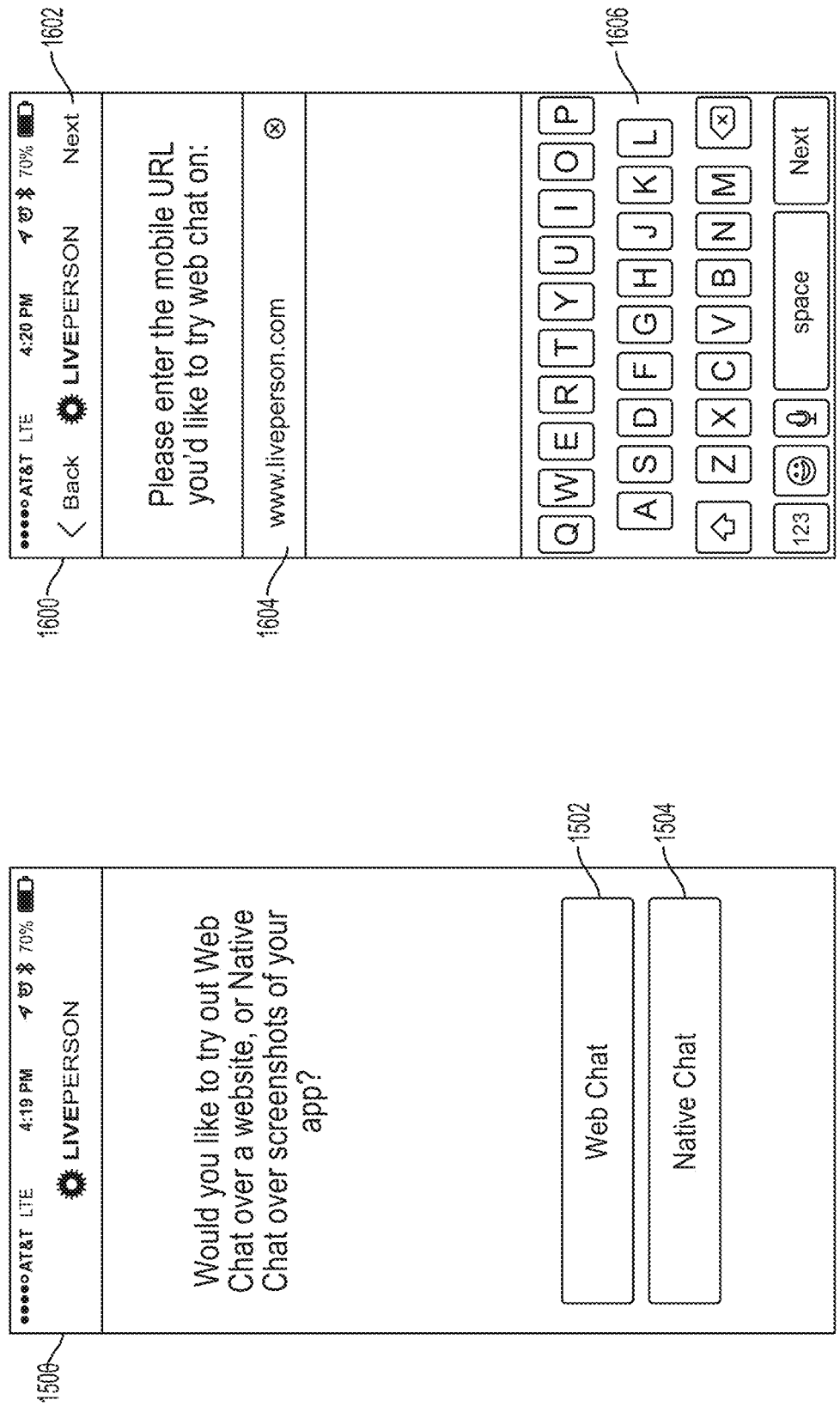

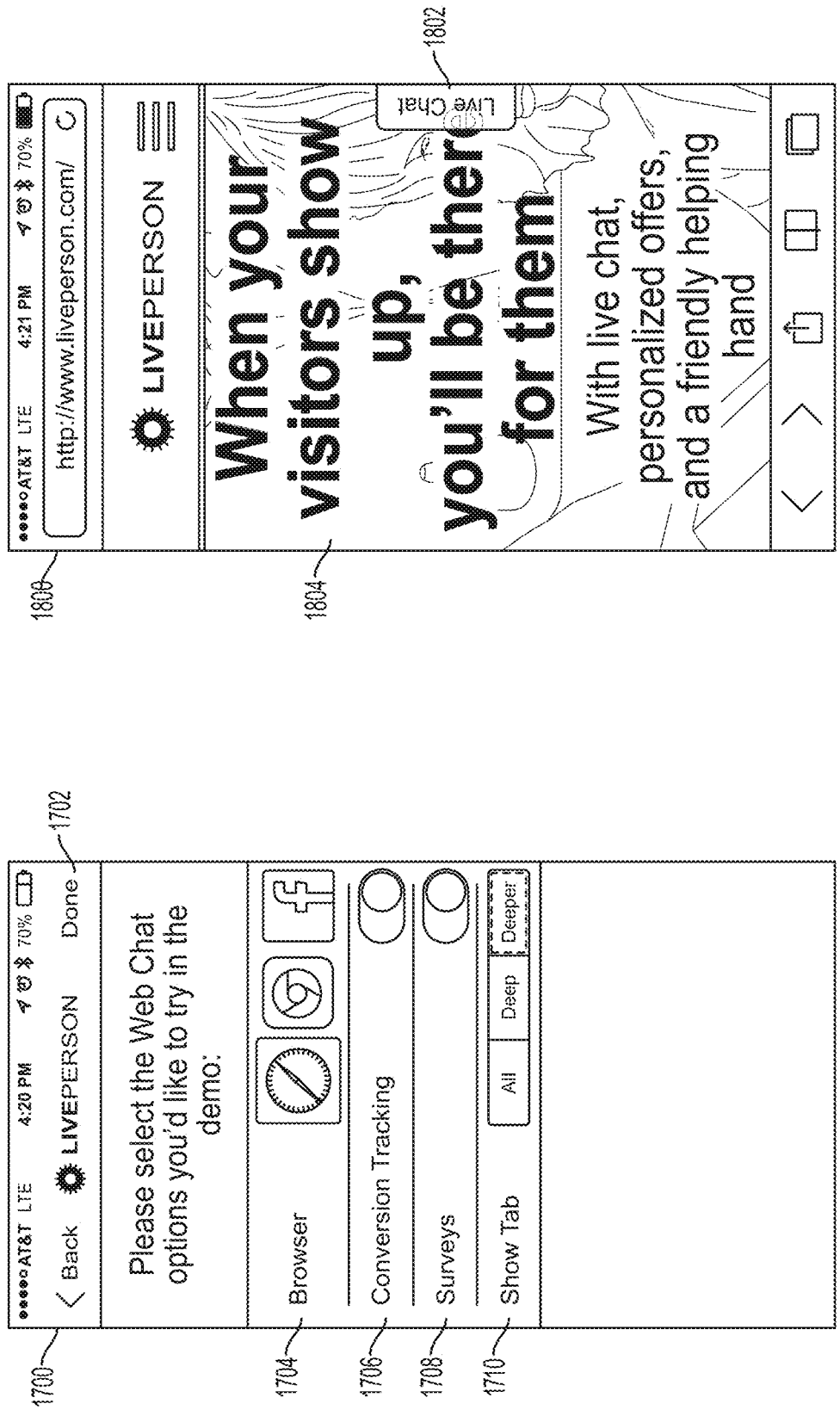

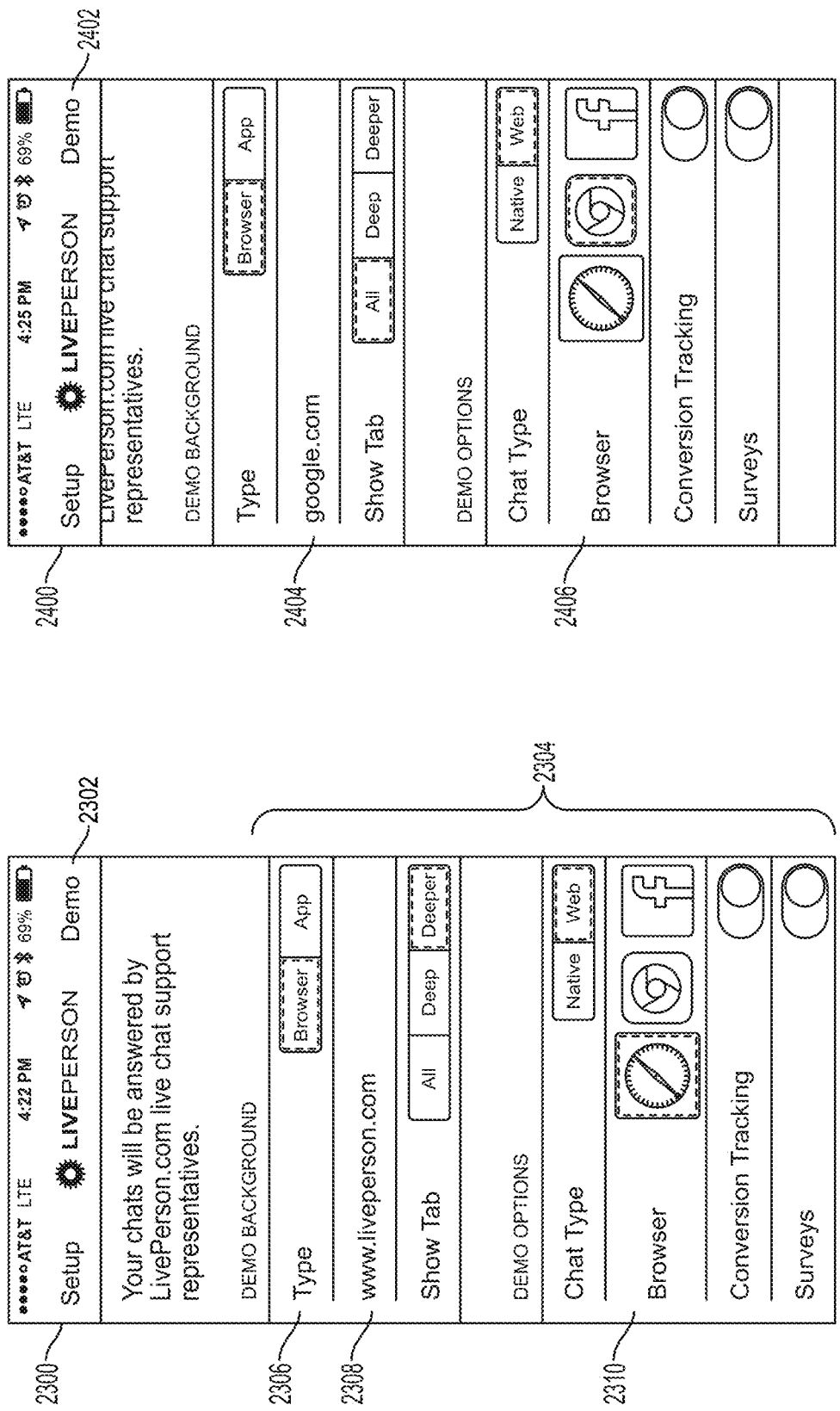

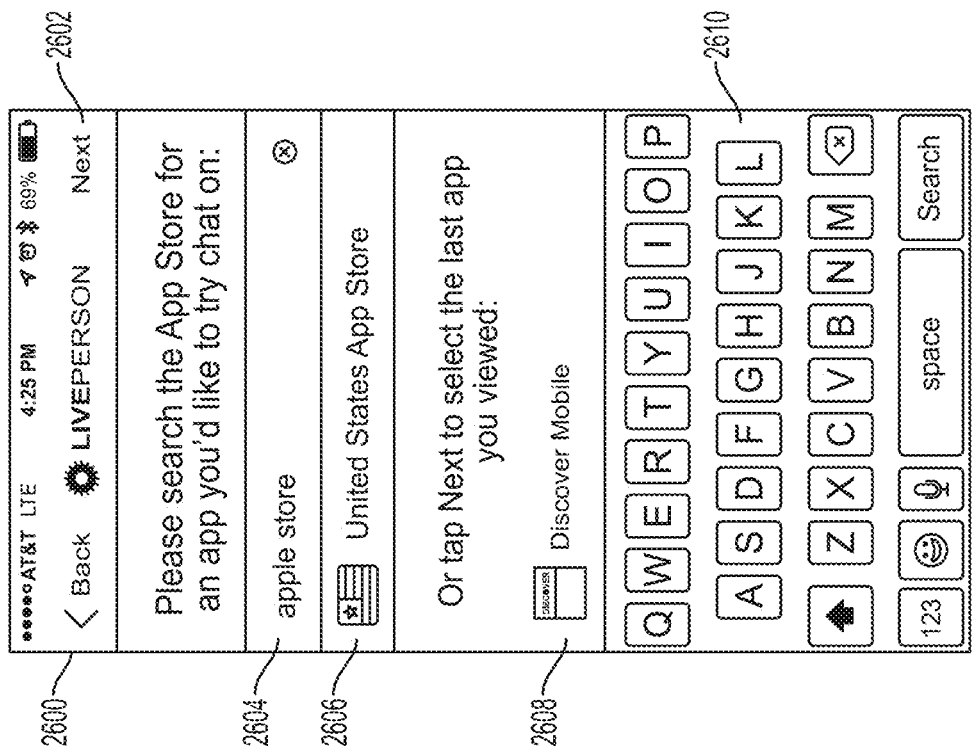

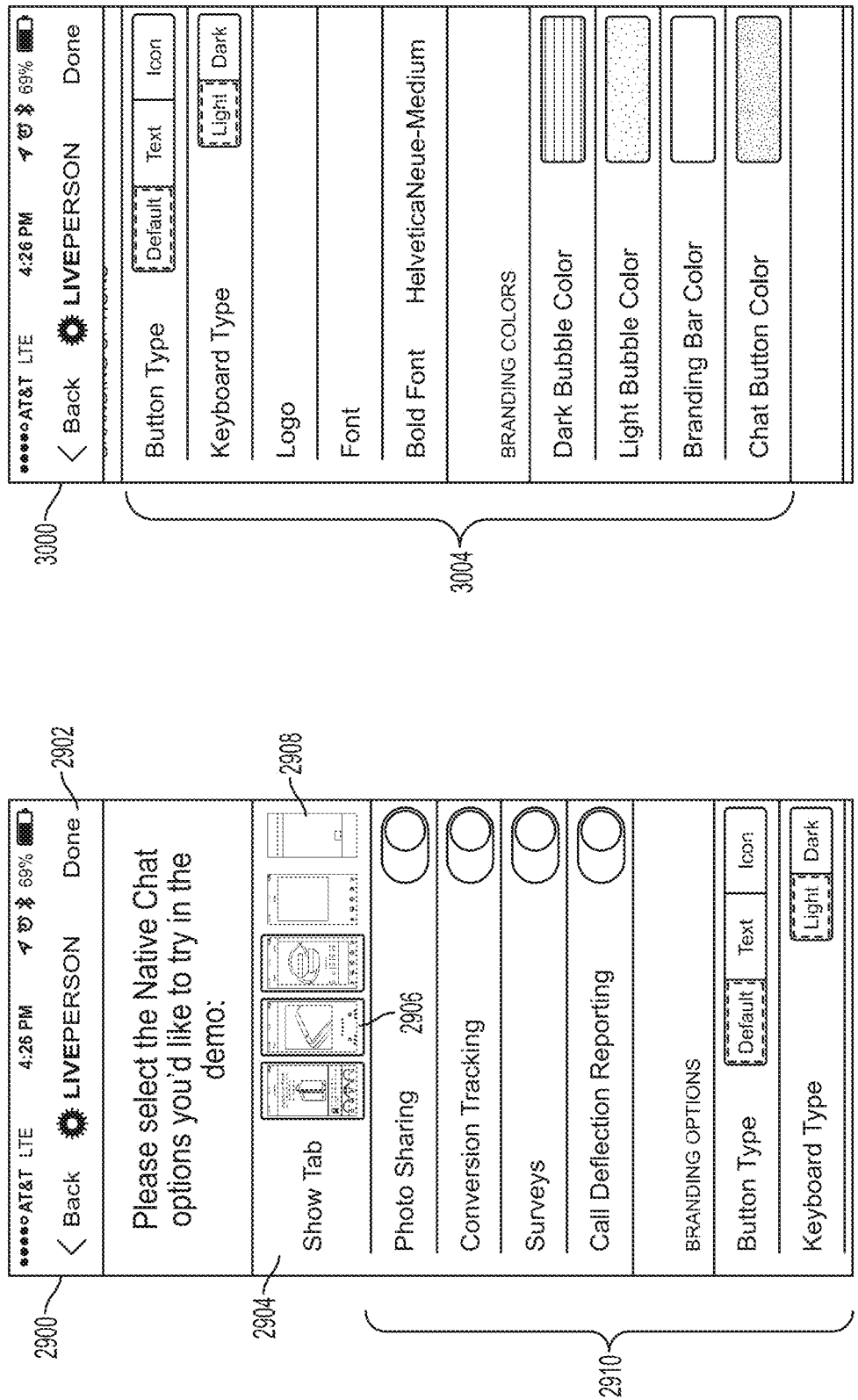

SYSTEM AND METHOD FOR INTERACTIVE APPLICATION PREVIEW

CROSS REFERENCE TO RELATED APPLICATIONS

This application is a continuation of U.S. patent application Ser. No. 17/130,268 filed Dec. 22, 2020, which is a continuation of U.S. patent application Ser. No. 14/883,946 filed Oct. 15, 2015, which claims the priority benefit of U.S. Provisional Patent Application No. 62/064,254 filed on Oct. 15, 2014, all of which are incorporated herein by reference in their entirety for all purposes.

TECHNICAL FIELD

The present disclosure relates to systems and methods for providing interactive application demonstration and configuration generally, and more specifically, to interactive demonstration and configuration of application libraries running on websites or in native applications.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain aspects and features of the present disclosure relate to an application that is used to test and experience the use of overlay elements (e.g., application add-ons, such as an interactive chat overlay) on a graphical interface (e.g., of a website or a computer application) before fully integrating the overlay elements into the graphical interface.

Embodiments of the present disclosure also relate to demonstrating changes to the appearance, functionality, or appearance and functionality of a live overlay element, running on a live website, in a demonstration application. Embodiments also relate to uploading those changes to the live website in order to update the live overlay element with the changes that were demonstrated in the demonstration application.

In some embodiments, a computer-implemented method may be provided. The computer-implemented method may include displaying, on a computing device, a graphical interface corresponding to a live website and determining an overlay element. The overlay element may be interactive and may demonstrate how the overlay element will look and act when incorporated into the graphical interface corresponding to the live website. The computer-implemented method may also include concurrently displaying the graphical interface with the overlay element. The overlay element may be incorporated into the graphical interface.

In some embodiments, a system may be provided. The system may include one or more data processors and a non-transitory computer-readable storage medium containing instructions which when executed on the one or more data processors, cause the one or more processors to perform operations. The operations may include displaying a graphical interface corresponding to a live website and determining an overlay element. The overlay element may be interactive and may demonstrate how the overlay element will look and act when incorporated into the graphical interface corresponding to the live website. The operations may also include concurrently displaying the graphical interface with the overlay element. The overlay element may be incorporated into the graphical interface.

In some embodiments, a computer-program product tangibly embodied in a non-transitory machine-readable storage medium may be provided. The non-transitory machine-readable storage medium may include instructions configured to cause a data processing apparatus to display a graphical interface corresponding to a live website and determine an overlay element. The overlay element may be interactive and may demonstrate how the overlay element will look and act when incorporated into the graphical interface corresponding to the live website. The instructions may also cause the data processing apparatus to concurrently display the graphical interface with the overlay element. The overlay element may be incorporated into the graphical interface.

In some embodiments, a method, system, or computer-program product for performing actions may be provided, and may include displaying, on a computing device, a graphical representation of a native application and determining an overlay element. In some examples, the overlay element may be interactive and may demonstrate how the overlay element will look and act when incorporated into the native application. The method, system, or computer-program product may also include concurrently displaying the graphical representation with the overlay element. The overlay element may be incorporated into the graphical representation.

In some embodiments, a method, system, or computer-program product for performing actions may be provided, and may include displaying, on a computing device, a graphical interface of a live native application running on the computing device and determining an overlay element. In some examples, the overlay element may be interactive and may demonstrate how the overlay element will look and act when incorporated into the live native application. The method, system, or computer-program product may also include concurrently displaying the graphical interface with the overlay element. The overlay element may be incorporated into the graphical interface.

In some embodiments, a computer-implemented method may be provided. The computer-implemented method may include loading, at a computing device, a demonstration application, accessing a live webpage using the demonstration application, and simultaneously displaying an overlay element in addition to the live webpage. Accessing the live webpage may include running the webpage on the computing device. The computer-implemented method may include accessing settings information from a server. In some examples, the settings information may control an appearance or functionality of the overlay element. The computer-implemented method may also include presenting configurable settings and updating the settings information with the configurable settings. For example, the configurable settings may include settings that control the appearance or functionality of the overlay element.

In some embodiments, a computer-implemented method may be provided. The computer-implemented method may include loading, at a computing device, a demonstration application and accessing a live website using the demonstration application. Accessing the live website may include running the live website on the computing device. The computer-implemented method may also include displaying a graphical interface corresponding to the live website. The graphical interface may include code to enable an overlay element. The overlay element may be simultaneously displayed over the graphical interface. In addition, the computer-implemented method may include presenting configurable settings of the overlay element and updating the code to enable the overlay element with the configurable settings.

In some embodiments, a computer-implemented method may be provided. The computer-implemented method may include loading, at a computing device, a demonstration application, displaying a prompt using the demonstration application, receiving a response to the prompt, and accessing a live website using the response to the prompt. For example, the prompt may request a live website address. Further, the computer-implemented method may include displaying a graphical interface corresponding to the live website and determining an overlay element. In some examples, determining the overlay element may include selecting a version of the overlay element from amongst a plurality of versions of overlay elements. The overlay element may be interactive and may demonstrate how the overlay element will look and act when incorporated into the graphical interface corresponding to the live website. The computer-implemented method may also include concurrently displaying the graphical interface with the overlay element. For example, the overlay element may be displayed over or in front of the graphical interface. As another example, the overlay element can be presented near or around the graphical interface. In some examples, the overlay element may be visible after a specific user input, such as a swiping movement.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The specification makes reference to the following appended figures, in which use of like reference numerals in different figures is intended to illustrate like or analogous components.

FIG. 15 is a depiction of a selection screen displayable on a computing device according to one embodiment.

FIG. 16 is a depiction of a URL entry screen displayable on a computing device according to one embodiment.

FIG. 17 is a depiction of a web chat initial settings screen displayable on a computing device according to one embodiment.

FIG. 18 is a depiction of a demonstration screen displayable on a computing device according to one embodiment.

FIG. 23 is a depiction of a settings screen displayable on a computing device according to one embodiment.

FIG. 24 is a depiction of a selection screen showing new URL and browser selections displayable on a computing device according to one embodiment.

FIG. 25 is a depiction of a selection screen displayable on a computing device according to one embodiment.

FIG. 26 is a depiction of a native app search screen displayable on a computing device according to one embodiment.

FIG. 29 is a depiction of an app settings screen displayable on a computing device according to one embodiment.

FIG. 30 is a depiction of an initial settings screen displayable on a computing device according to one embodiment.

DETAILED DESCRIPTION

Figure 1:
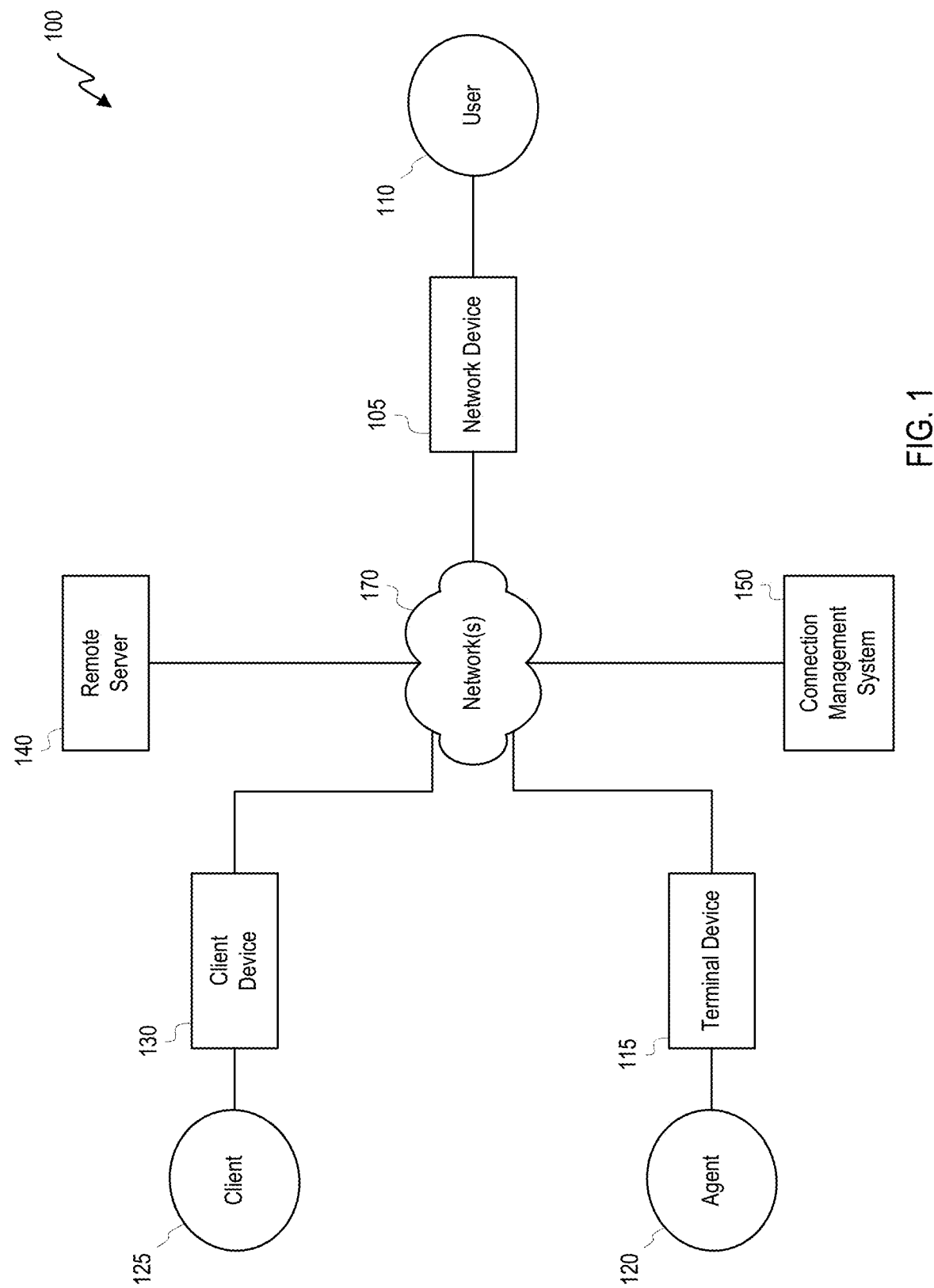
FIG. 1 shows a block diagram of an embodiment of a network interaction system.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Certain aspects and features of the present disclosure relate to an application that is used to test and experience the use of overlay elements (e.g., application add-ons, such as an interactive chat overlay) on a graphical interface (e.g., of a website or a computer application) before fully integrating the overlay elements into the graphical interface.

For example, the disclosed concepts can be used in a demonstration application ("demo app") that is a native application running on a user device, such as a mobile device (e.g., a smartphone) or a laptop or desktop computer. The demonstration application can load a graphical interface that is a live version of the graphical interface or an image of the graphical interface. The live version of the graphical interface can be a live website or web application. The demonstration application can determine an overlay element (e.g., a live chat application) to present with the graphical interface, thus allowing the graphical interface to be presented as if the graphical interface had included the code to enable the overlay element (e.g., the live website can be presented as if it included code enabling a live chat application). In an embodiment, the demo app can enable a user to interact with a live website and also interact with an overlay element, such as by starting and engaging in a live chat.

In some embodiments, the user can edit settings of the overlay element, such as by changing how the interface appears on the user device (e.g., color of chat window) or how the interface operates (e.g., ability to upload a photo during the chat). Settings can be exported, saved, or transmitted to another device (e.g., a server). Settings can be used at a later time when the overlay element is being incorporated into the graphical interface.

In some cases, the overlay element may be already incorporated into the graphical interface (e.g., a live webpage already including a live chat). In such cases, when the graphical interface is loaded into the demo app, the live settings of the already-incorporated overlay element can be accessed and the local settings for the overlay element in the demo app can be updated with the live settings. Changes can be made to the local settings of the overlay element displayed on the demo app, and then can be exported, saved, or transmitted. In an embodiment, local settings can be used to update the live settings, such as by transmitting the local settings to a sever and updating the live settings on the server with the local settings. The demo app can be used to demonstrate changes in the settings of an overlay element on a graphical interface, and then can be used to update the live settings (e.g., a JSON file on a web server) of a live version of the overlay element with the local settings of the local version of the overlay element running in the demo app, thus enabling the demo app to update a live website.

Additionally, interactive features of the overlay element can be tied into interactive features of the already-incorporated overlay element. In an example, a company may have an already-incorporated live chat client included with their live webpage. That live chat client can direct chats to a selected set of chat receivers associated with chat operators who are knowledgeable about that particular company's services (e.g., a sales person or employee of the company). When the demo app is used, the live chat client of the demo app can use downloaded settings or a client identifier (e.g., provided by user input into the demo app or downloaded from the live website) to direct chats that are initiated in the local version of the overlay element running in the demo app to the same chat receivers associated with the live chat client in the live webpage.

In some embodiments, the live chat client of the demo app can direct chats to generic chat receivers, such as chat receivers associated with chat operators who are knowledgeable about the provider of the overlay element.

In some embodiments, upon loading the demo app, the demo app presents a user with an option to choose either a live website or a native app. Depending on the option selected, the demo app can determine to use a version of the overlay element that is written in code executable form within a web browser (e.g., if the user selects the live website option), or a version of the overlay element written in native code (e.g., code specifically written for the platform or operating system of the user's device).

In an embodiment, upon selecting the live website option, the demo app can prompt a user to enter a web address (e.g., a Uniform Resource Locator, or URL) and the demo app then accesses the website through an internet connection. The demo app also loads a web-enabled version of the overlay element (e.g., a version of the overlay element written in code executable from within a web browser). The demo app presents the live website and the overlay element at the same time. The demo app allows a user to navigate the live website as if they were accessing the live website through any standard web browser. Additionally, the demo app allows a user to interact with the overlay element, which can be a live chat room. In some examples, the user can open a chat using the overlay element and use all of the features of the overlay element, such as chatting with a chat operator. The chat operator can be an individual provided by the company supplying the overlay element, can be an individual provided by the company running the live website, or another individual.

In an embodiment, upon selecting the native app option, the demo app can provide the user an option to search an application store ("app store") containing native applications. The demo app can display a list of native applications that match the user's search. The user can select a native application from the list. The demo app can then access screenshots or videos of the native application that is selected. In some embodiments, the demo app can access the native application itself. The demo app can present the screenshots, or video of the native application as a representation of the graphical interface, or the demo app can present the graphical interface (e.g., the native application) itself. The demo app can also display the overlay element with the graphical interface or representation of the graphical interface. The overlay element can be interactive (e.g., a live chat that can be used to actually chat with another).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates anew communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication. This determination may depend, at least in part, on a topic associated with the communication, a sentiment score associated with the communication or a past related communication, a predicted (e.g., relative or absolute) response latency for terminal device 115 and/or a type of communication channel associated with the communication (e.g., instant message, message, email, phone). Selecting an established communication channel may promote consistency and reduce the need to relay information from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's knowledge base corresponds to a communication topic, an availability of an agent at a given time and/or over a channel type, a language match between a user and agent, and/or a personality analysis.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining and assessing one or more categories or tags of a current or past communication or communication series. For example, a communication can be assigned a category for each of (for example) a demonstration communication using an interactive demonstration application (discussed in detail with respect to at least FIGS. 7-40), a topic, channel type (e.g., email, SMS message, real-time chat, phone call or asynchronous message), language, complexity level, sentiment, and/or whether/which file type is attached, and a terminal-device selection can be biased towards terminal devices associated with similar, same or complementary knowledge bases, channel-type availability, language, skill level, sentiment, and/or file-type capabilities.

In some examples, communication analysis can include determining whether a communication is received from an interactive demonstration application. In these examples, upon determining that a communication is received in association with an interactive demonstration application (e.g., a demonstration application for testing an experience of an overlay element), communication management system 150 may route the communication to a specific or pre-designated agent communication devices (e.g., terminal device 115). The communication analysis can include determining and applying a rule to the communication received from an interactive demonstration application in order to influence routing determinations.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular product, connection management system 150 can automatically transmit an additional message to terminal device 115 containing additional information about the product (e.g., quantity of products in stock, links to support documents related to the product, or other information about the product or similar products).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

In some examples, connection management system 150 can facilitate an initial match and routing between network device 105 and a first terminal device 115. For example, a message received in a communication from network device 105 (e.g., a user device which is running an interactive demonstration application) can be routed to the first terminal device 115 when the connection management system 150 determines that the communication is received via an interactive demonstration application running on network device 105. Determining that the communication is received via an interactive demonstration application can include determining whether a particular identifier or code associated with the interactive demonstration application is included in the communication. In some instances, the first terminal device 115 can include, for example, a terminal device associated with network device 105 (e.g., a communication device used by an agent who is associated with an entity of the user), a terminal device associated with a different entity (e.g., a communication device used by an agent who is associated with the connection management system 150), and so on.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
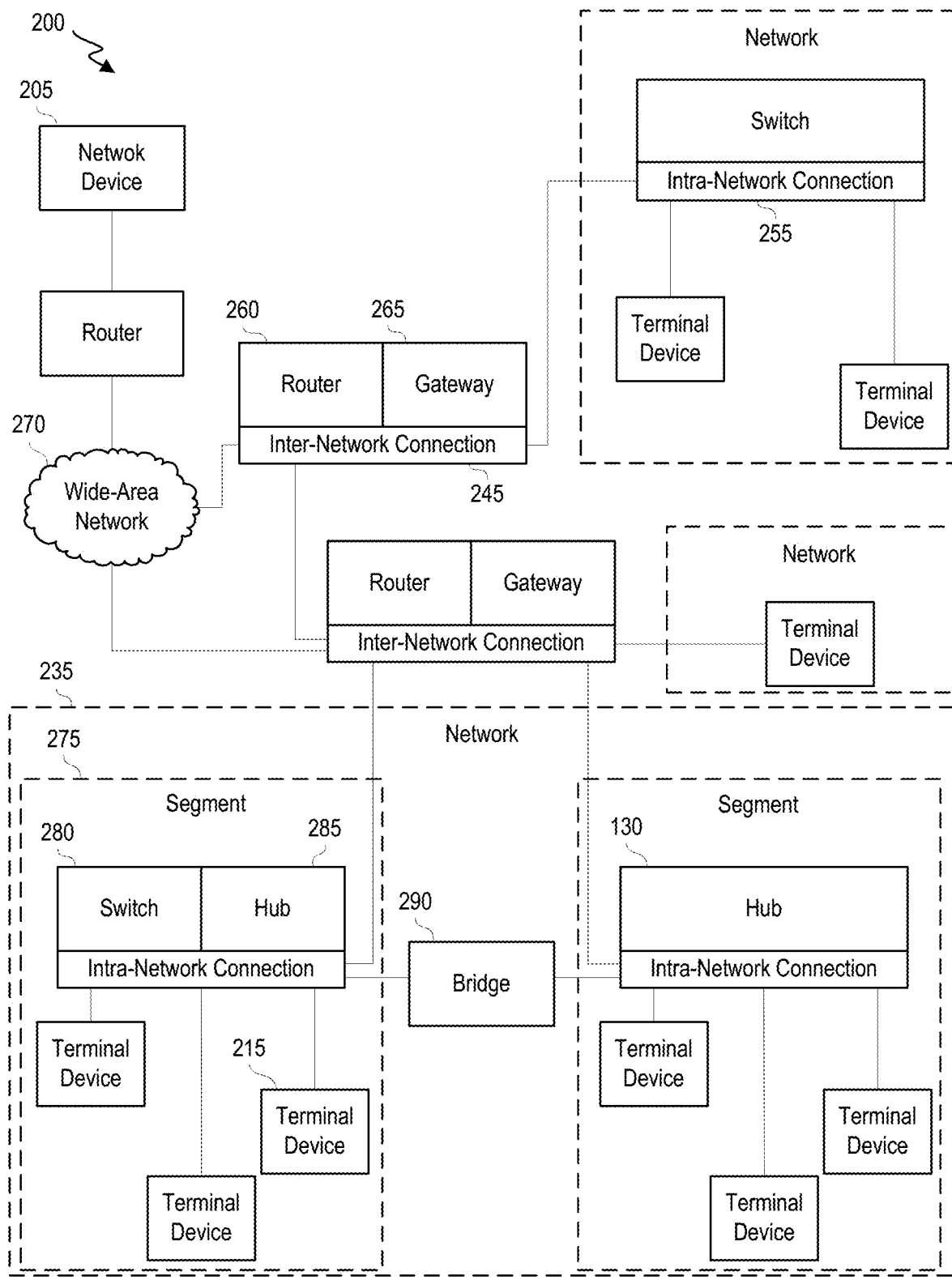
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
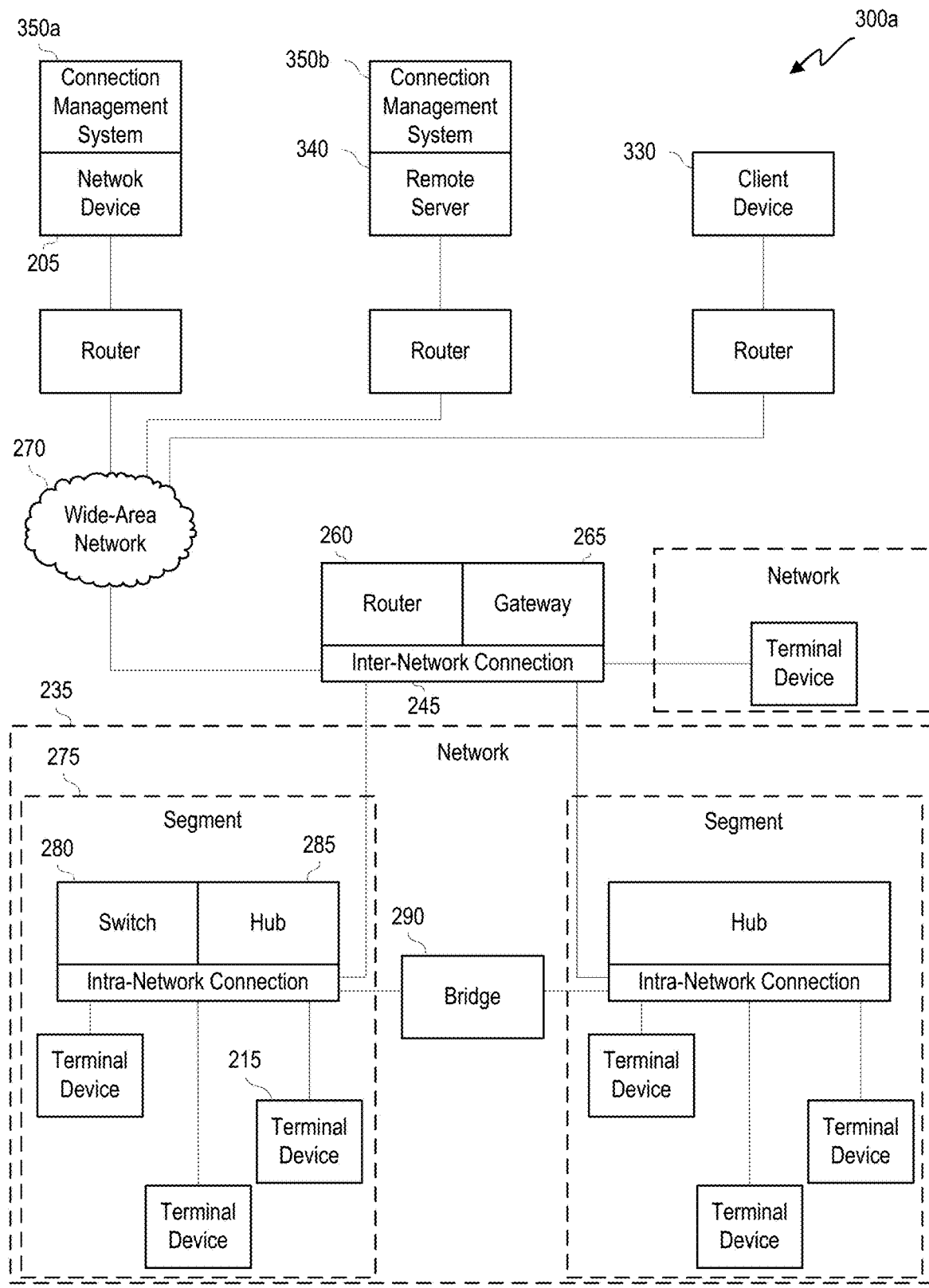
FIGS. 3A-3C show block diagrams of other embodiments of a network interaction system that includes a connection management system.
Figure 3B:
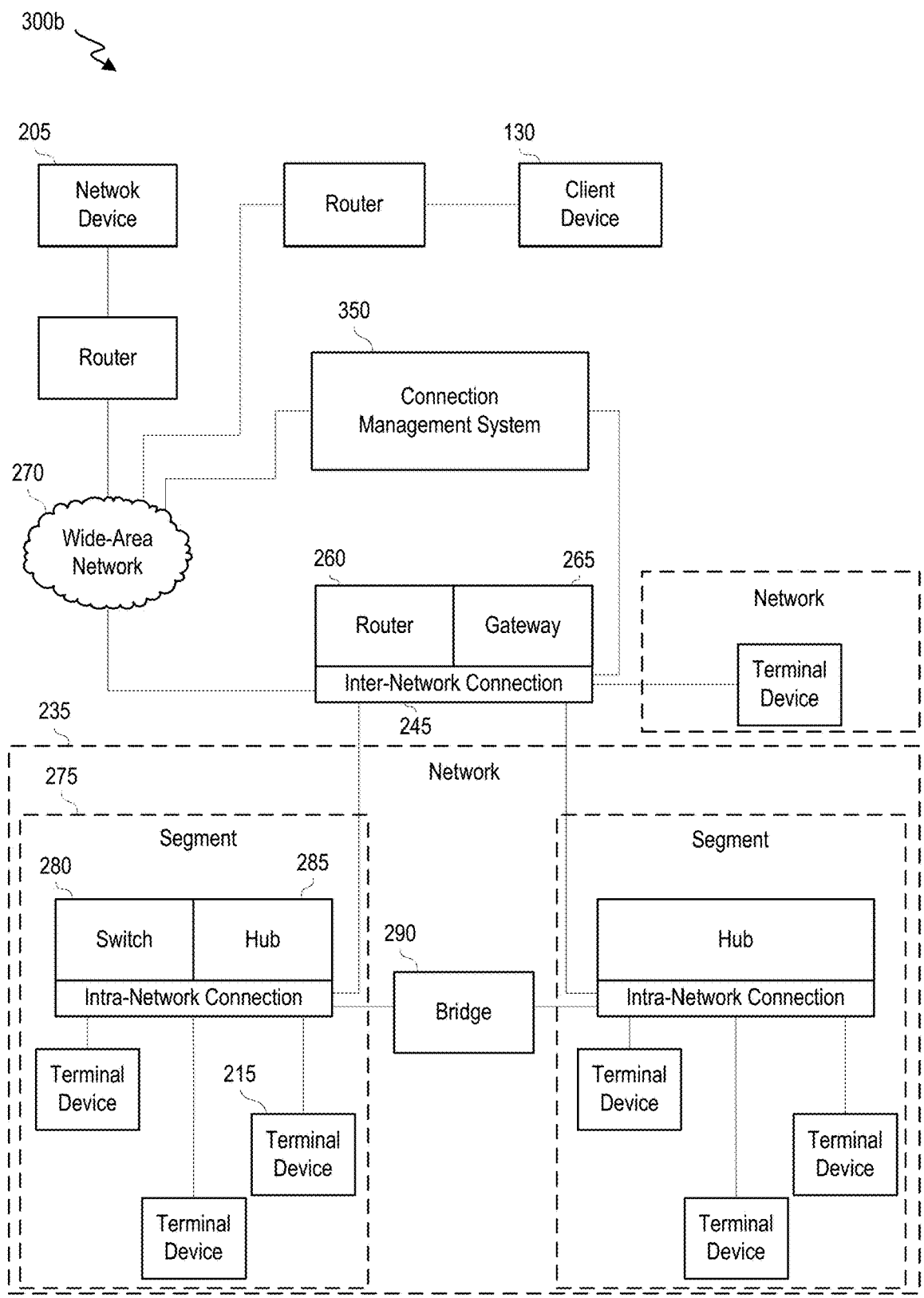
Figure 3C:
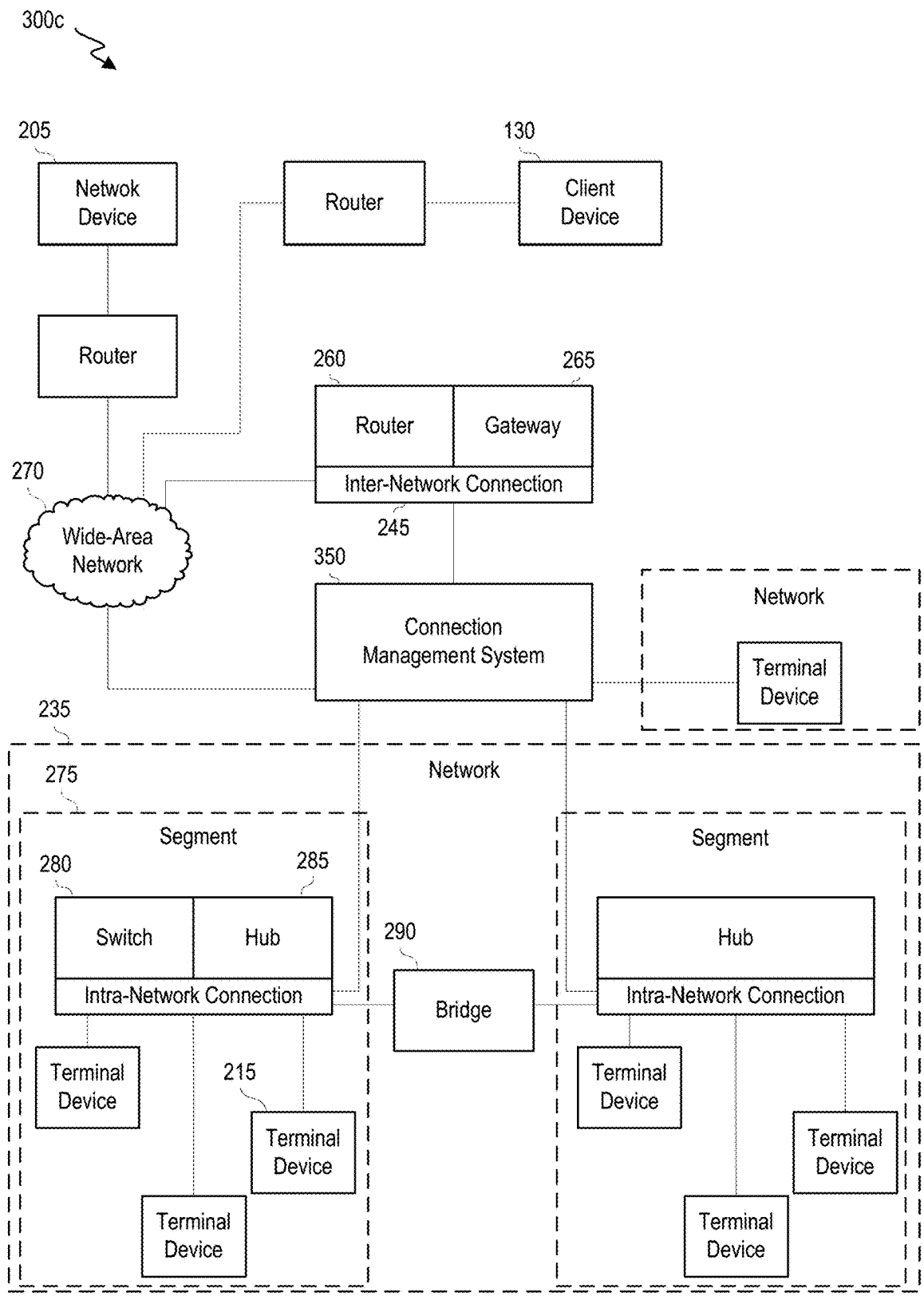

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
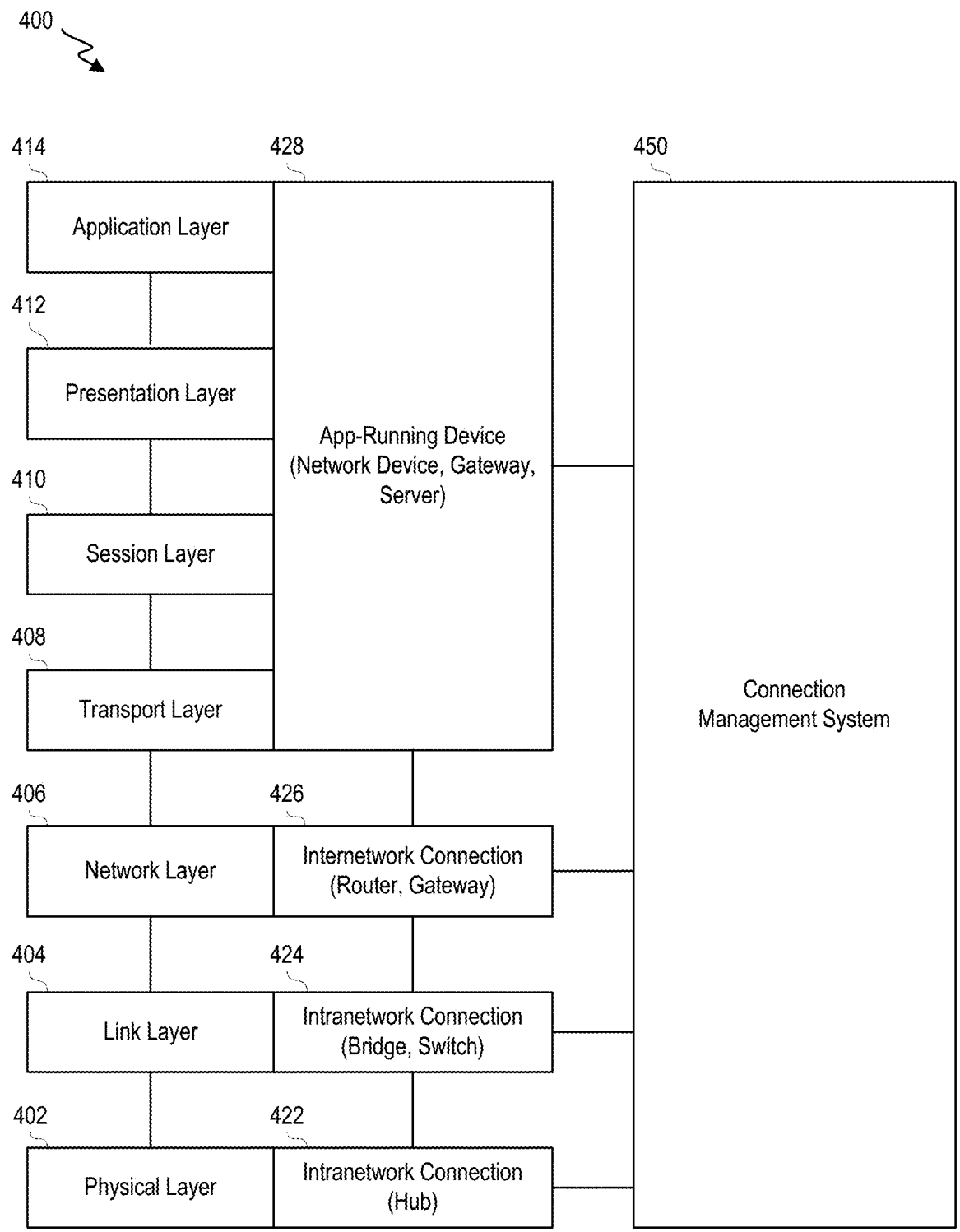
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
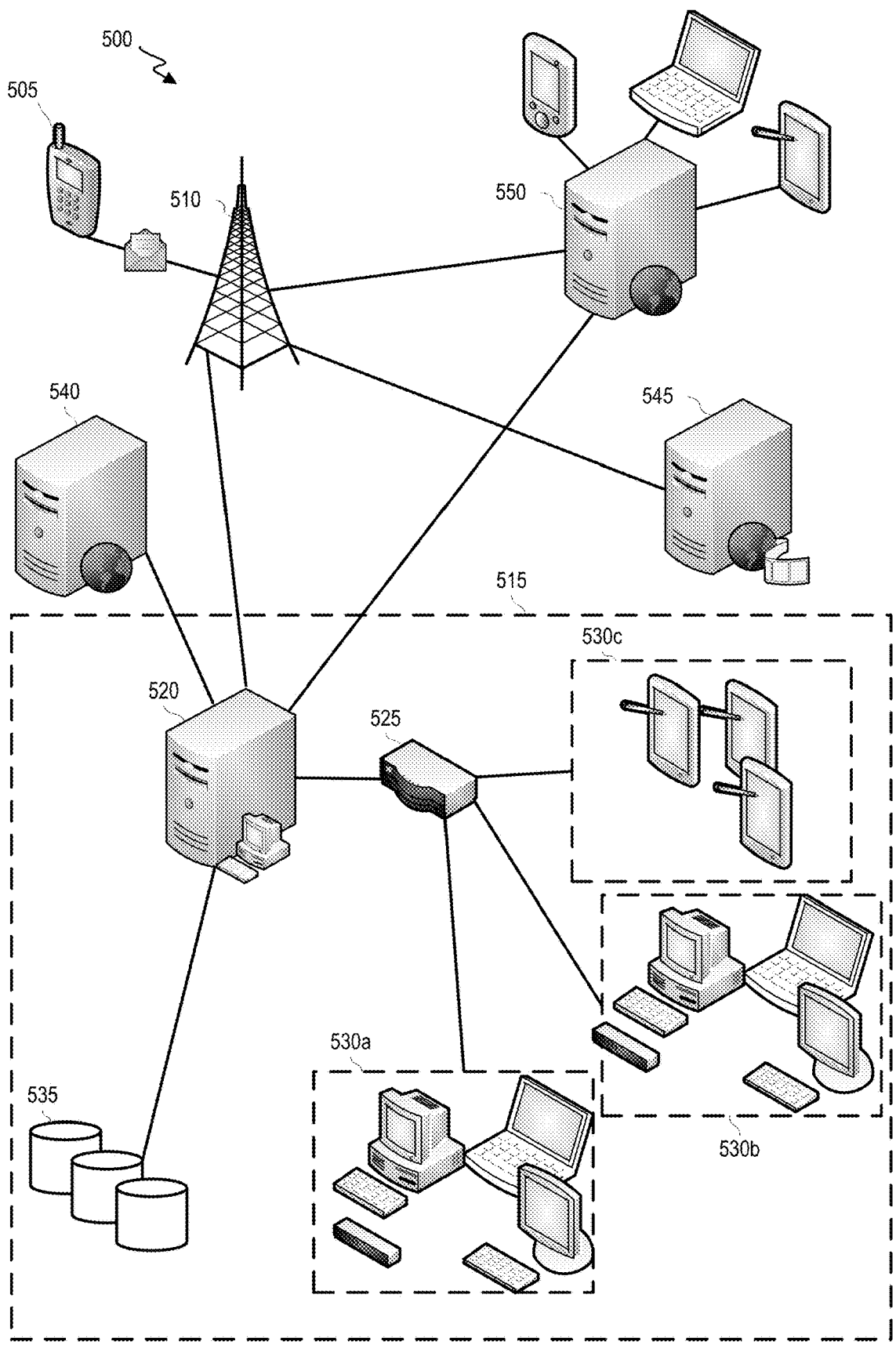
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 520 also is connected to a web server 540. Thus, connection management system 540 can retrieve data of interest, such as technical product details, news, current product offerings, current or predicted weather, and so on.

Network device 505 may also be connected to a web server (e.g., including a streaming web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) sentiment towards a given topic or estimate a general behavior of a given user or class of users.

Figure 6:
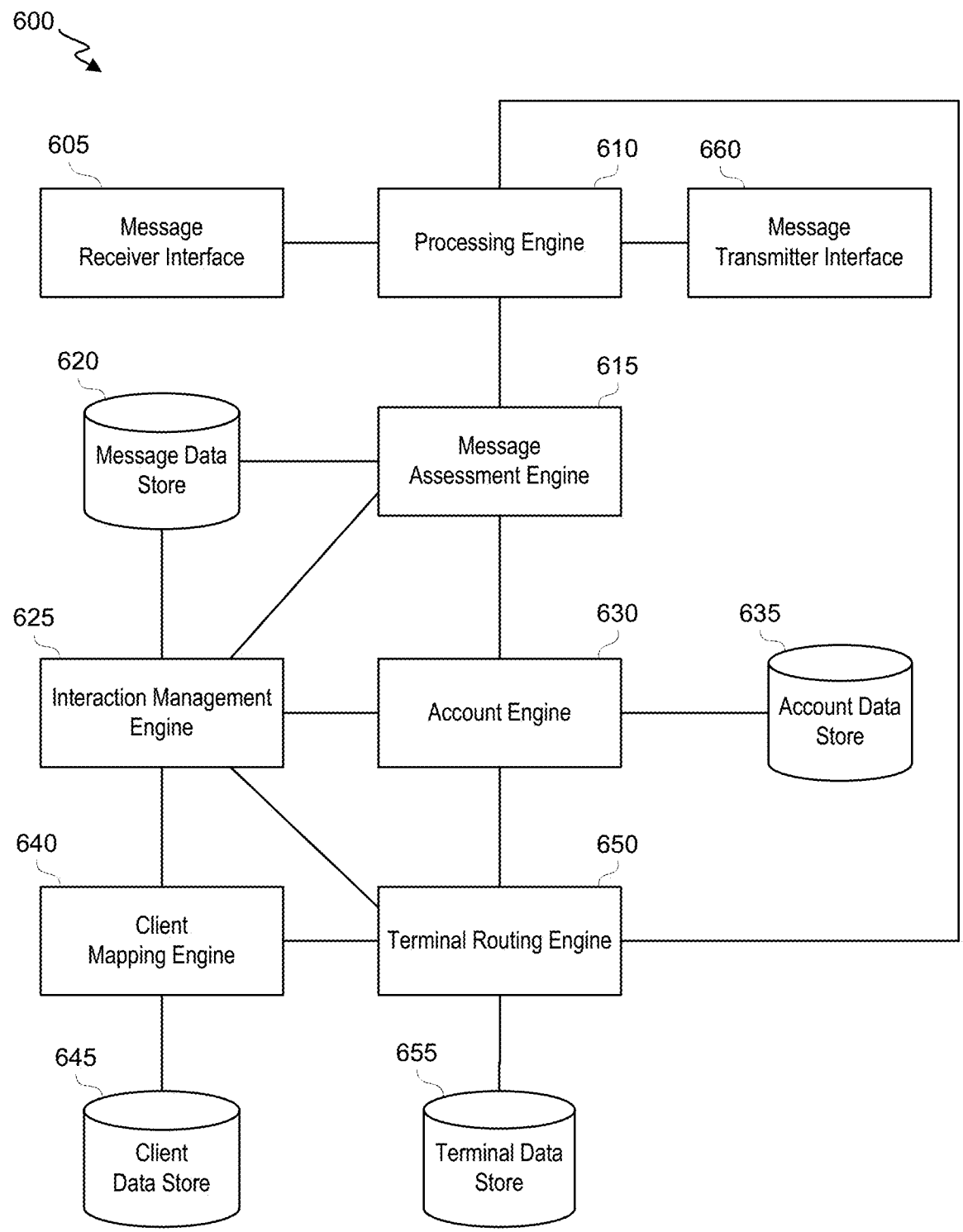
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client. As another example, the message can include or be associated with an identifier indicating that the message is being transmitted in connection with an interactive demonstration application running on a network device. An interactive demonstration application may facilitate a demonstration of how an overlay element will look and feel when it is integrated into a website. Upon determining that the message includes an identifier associated with the interactive demonstration application, the message can be routed to a particular terminal device or particular set of terminal devices (e.g., terminal devices used by agents).

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a product, a service, a technical issue, a use question, a complaint, a refund request or a purchase request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or account) has previously communicated with a given terminal device (e.g., about matters relating to a client), communication routing can be generally biased towards the same terminal device. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more terminal devices or agents); whether the terminal device (or corresponding agent) is available; and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device (e.g., about matters relating to a client), a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client), a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. A terminal device selection can then be made by comparing terminal devices' scores (e.g., to select a high or highest score).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series (e.g., days, weeks or months). In some instances, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and terminal device. The score may pertain to an overall match or one specific to a given communication or communication series. Thus, for example, the score may reflect a degree to which a given terminal device is predicted to be suited to respond to a network-device communication. In some instances, a score analysis can be used to identify each of a terminal device to route a given communication to and whether to establish, use or terminate a connection channel. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different terminal device.

To illustrate, a set of three terminal devices associated with a client may be evaluated for potential communication routing. A score may be generated for each that pertains to a match for the particular communication. Each of the first two terminal devices may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third terminal device is immediately available. It may be predicted that the second terminal device will be available for responding within 15 minutes, but that the first terminal device will not be available for responding until the next day. Thus, a fast-response sub-score for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third terminal device. If routing to a particular terminal device is unsuccessful, the message can be routed to a device with the next-highest score, and so on.

A score may be compared to one or more absolute or relative thresholds. For example, scores for a set of terminal devices can be compared to each other to identify a high score to select a terminal device to which a communication can be routed. As another example, a score (e.g., a high score) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message, email, chat, phone), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Figure 7:
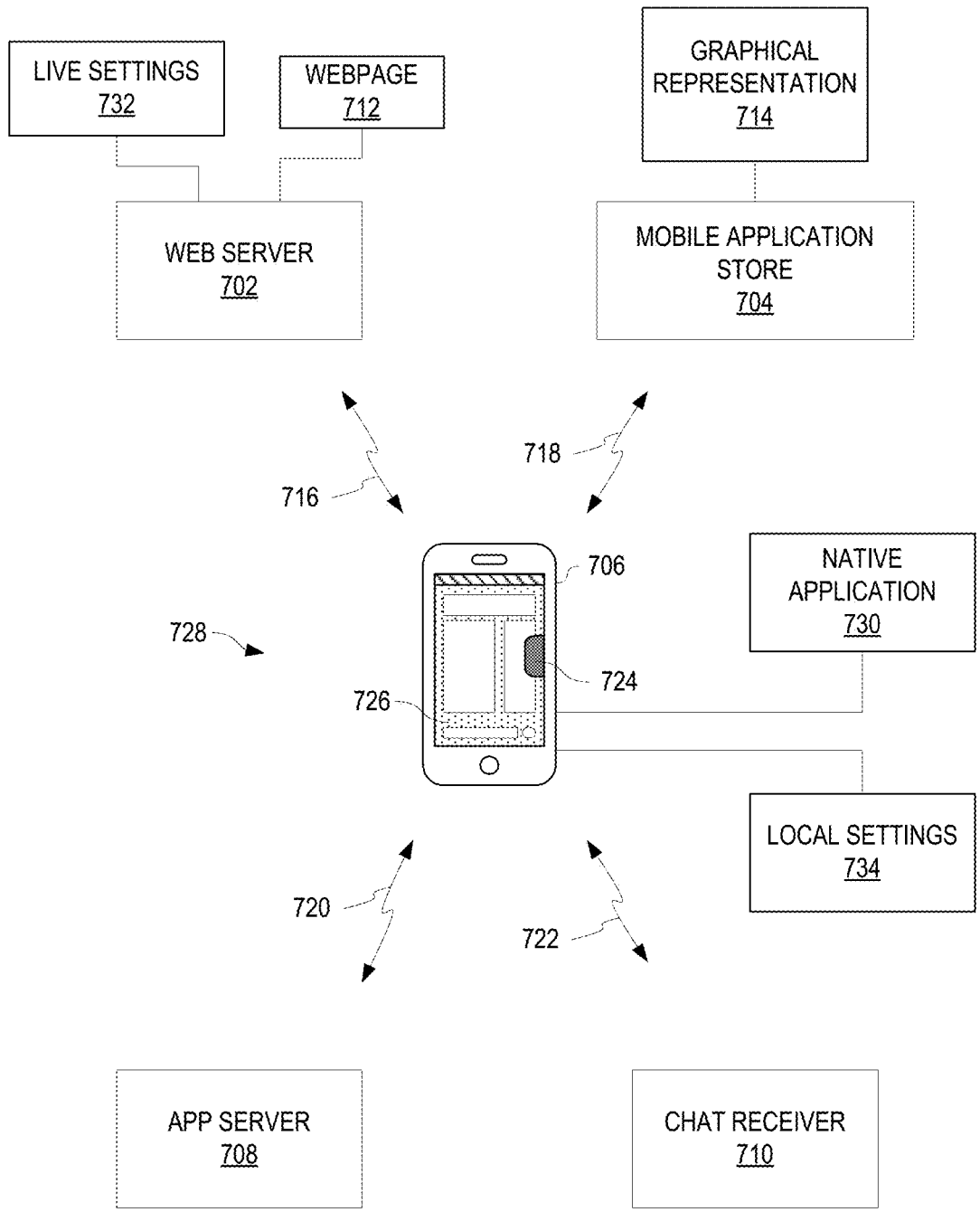
FIG. 7 is a block diagram of a demonstration application environment according to one embodiment.

FIG. 7 is a block diagram of a demonstration application environment 700 according to one embodiment. The demonstration application environment 700 can include a user device 706, such as a computer or mobile device, running a demonstration application 728. The demonstration application 728 can present a graphical interface 726 and an overlay element 724. The overlay element 724 can be interactive and running live on the user device 706. The overlay element 724 includes code, application libraries, or other aspects that are running on the user device 706. The overlay element 724 can be present as an actual overlay in front of the graphical interface 726, or can be presented near or around the graphical interface 726. In some embodiments, the overlay element 724 is only visible after a specific user input, such as a specific key combination, a specific swiping movement, a multitouch input, or other specific user input.

In an embodiment, the graphical interface 726 is a webpage 712. The demonstration application 728 can cause the user device 706 to prompt the user for a web address of a web server 702. The user device 706 can establish a data connection 716 with the web server 702 to obtain and load the webpage 712. The user device 706 would therefore be loading the webpage 712 and the overlay element 724 simultaneously. The webpage 712 can be presented live (e.g., running on the user device 706) and can be fully interactive, as well as the overlay element 724, as if the webpage 712 had already included the overlay element 724 and was simply running in a web browser on the user device 706.

In an embodiment, the graphical interface 726 is a graphical representation 714 of a native application. The demonstration application 728 can cause the user device 706 to prompt the user for a native application, such as by name, by selecting from a list, or by querying. The user device 706 can establish a data connection 718 with a mobile application store 704 in order to perform queries for a native application. The data connection 718 can be used to access the graphical representation 714 of the native application. The graphical representation 714 can be an image (e.g. a screenshot) or a video depicting the graphical interface of the native application. The user device 706 can load the graphical representation 714 and the overlay element 724 simultaneously. The overlay element 724 can be presented to appear as if it were already included in the graphical interface depicted by the graphical representation 714, and the overlay element 724 can be presented live and can be fully interactive. The graphical representation 714, being a representation of the graphical interface and not the graphical interface itself, can be presented as a still image or a video, but may not be fully interactive.

In some embodiments, the graphical interface 726 is another native application 730 residing within memory of the user device 706. The user device 706 can prompt a user to select the native application 730 from a list of native applications located in a memory of the user device 706. The demonstration application 728 can present the native application 730 and overlay element 724 simultaneously, as if the overlay element 724 were already integrated into the native application 730. Both the native application 730 and the overlay element 724 may be presented live and may be fully interactive.

In an embodiment, the overlay element 724 can be a live chat client. The overlay element 724 can include interface elements, such as text boxes and chat bubbles, that allow a user to interact with a live human operating a chat receiver 710. Upon initiating a proper command (e.g., clicking or tapping on the overlay element 724), the user device 706 can establish a chat connection 722 with a chat receiver 710. In some embodiments, by default, the demonstration application 728 can establish a chat connection 722 with a chat receiver 710 associated with the demonstration application 728. In some embodiments, the demonstration application 728 can establish a chat connection 722 with a chat receiver 710 associated with another company, as defined by settings of the overlay element 724.

In some embodiments, the user device 106 can establish a data connection 720 with an app server 708. The app server 708 can be a server that supports the operation of the overlay element 724, such as by providing information on which chat receiver 710 to contact. In some embodiments, the user device 706 can provide client identification information (e.g., a number or a name) to the app server 708, which can then be used to provide settings information to the user device 706, which can determine how the demonstration application 728 operates. For example, a client identification number stored on the user device 706 can be transmitted to the app server 708 and the app server 708 can return an address of the chat receiver 710 to use. The demonstration application 728 can then cause the overlay element 724 to initiate a chat connection 722 with the chat receiver 710 based on the address provided by the app server 708. This address can be different than the default address built into the demonstration application 728. In this way, a client using the demonstration application 728 to test a live chat overlay on their webpage 712 would be able to connect to the chat receiver 710 associated with their company, rather than a generic chat receiver 710. In some embodiments, the client identification information can be stored in the user device 706 (e.g., input into the demonstration application 728 by a user) or can be stored in association with the webpage 712, web server 702, or native application 730.

In some embodiments, the user device 706 can obtain settings information from the web server 702 via the data connection 716. Settings information can be stored on the web server 702 or on a separate server associated with the web server 702. In some embodiments, the settings information can be stored on the app server 708. In some embodiments, the settings information can be stored as a JavaScript Object Notation (JSON) file. The settings information can be stored as another type of data file, such as an XML or YAML file.

In some embodiments, a webpage 712 or native application 730 can have a live overlay element already incorporated into the graphical interface. The webpage 712 or native application can have live settings information 732 (e.g., settings information used by the live overlay element to control the live overlay element's functionality or appearance). In some embodiments, the user device 706 can access the live settings information 732. The user device 706 can use the live settings information 732 to update local settings 734. The local settings 734 can control the functionality or appearance of the overlay element 724 that is running in the demonstration application 728.

In some embodiments, the user device 706 can use the local settings 734 to update live settings 732, as described in further detail below.

Figure 8:
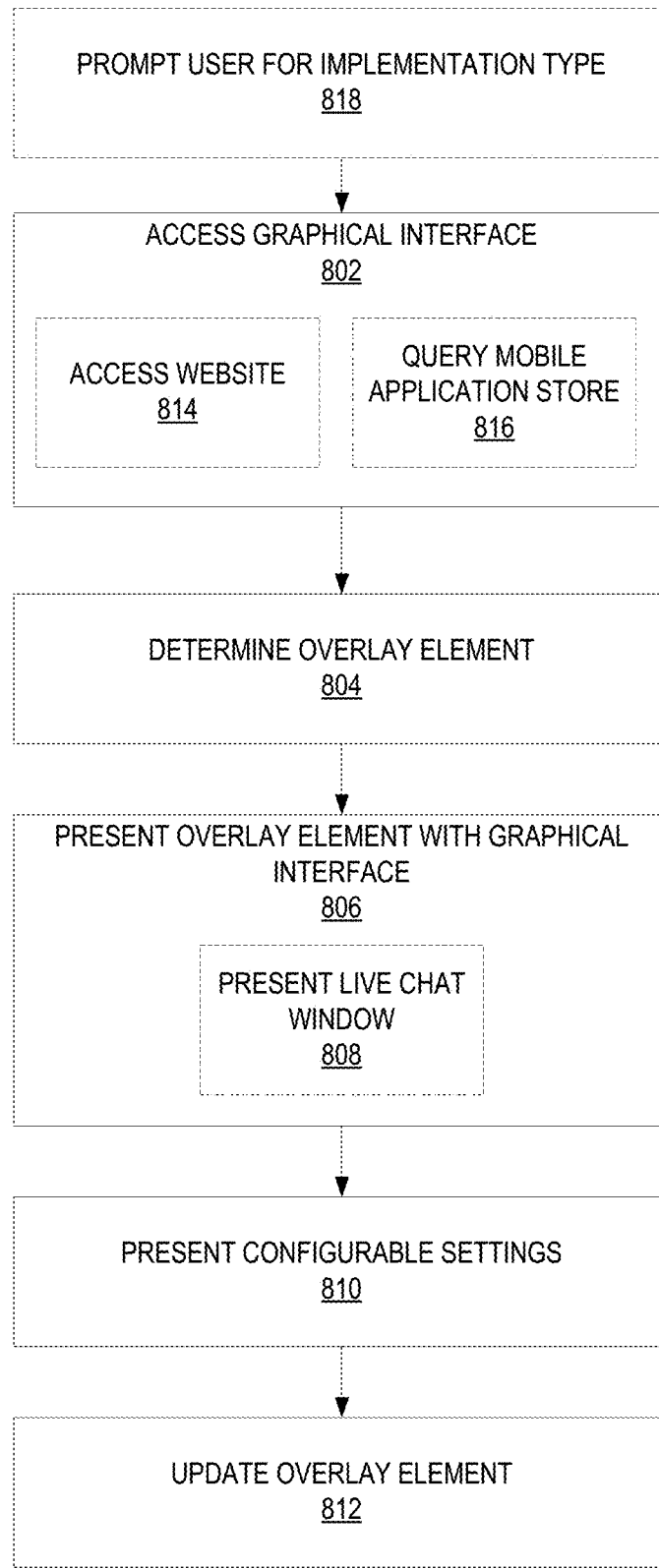
FIG. 8 is a flow chart of a process for demonstrating an application on a computing device.

FIG. 8 is a flow chart of a process 800 for demonstrating an application on a computing device. The computing device can be running a demonstration application. At block 802, the computing device can access a graphical interface. Accessing a graphical interface at block 802 can optionally include accessing a website at block 814, which can include running the website on the computing device. Accessing a graphical interface at block 802 can optionally include querying a mobile application store 816, which can include obtaining a graphical interpretation of a graphical interface in the form of an image or a video. In some embodiments, the graphical interface accessed at block 802 is a native application.

In some embodiments, the computing device can optionally prompt the user for an implementation type at block 818. Prompting the user for an implementation type at block 818 can include having the user select between a live website implementation type and a native app implementation type. The implementation type selected at block 818 can be used to determine how the graphical interface is accessed at block 802. In some embodiments, the implementation type selected at block 818 can determine which version of an overlay element to present at block 804.

At block 804, an overlay element is determined. Determining an overlay element can include accessing code for the overlay element. In some embodiments, determining an overlay element can include selecting a version of the overlay element from multiple versions of the overlay element. In some embodiments, a web version of the overlay element (e.g., a version of the overlay element designed to be integrated into the code of a webpage) can be presented if the graphical interface accessed at block 802 is a website. In some embodiments, a native version of the overlay element (e.g., a version of the overlay element designed to be integrated into the code of a native application) can be presented if the graphical interface accessed at block 802 is a native application or a graphical representation of a native application.

At block 806, the overlay element is presented with the graphical interface. The overlay element can be presented in front of the graphical interface. The overlay element can be presented adjacent to the graphical interface. In some embodiments, presenting the overlay element with the graphical interface at block 806 optionally includes presenting a live chat window at block 808.

At block 810, the computing device presents configurable settings. Configurable settings can include settings that control the functionality of the overlay element. Configurable settings can include settings that control the appearance of the overlay element. In some embodiments, the configurable settings that are presented at block 810 are determined based on whether the graphical interface accessed at block 802 is a website, a native application, or a graphical representation of a native application. In some embodiments, the configurable settings that are presented at block 810 are determined based on client identification information. For example, based on client identification information, the demonstration application running on the computing device can present a first set of configurable settings to a first client and present a second set of configurable settings to a second client. The demonstration application can transmit the client identification information to a server external to the computing device and can receive a signal indicating what configurable settings to present at block 810. Thus, a client with a first level of service (e.g., live chatrooms without images) can be given a first set of configurable settings (e.g., standard live chat settings), while a client with a second level of service (e.g., live chatrooms with images) can be given a second set of configurable settings (e.g., standard live that settings and settings specific to image sharing).

Examples of suitable configurable settings for an overlay element that is a live chat element can include: an option to select the type of web browser to simulate when the graphical interface is a live website, an option to enable conversion tracking, an option to enable surveys, an option to enable photo sharing, an option to enable call deflection reporting, options to adjust the appearance of buttons, options to adjust the appearance of the chat keyboard, options to change a logo that is presented, options to adjust fonts present in the live chat, options to adjust colors present in the live chat, options to adjust overlay appearance (e.g., blur, color, and alpha), and other options.

At block 812, the overlay element can be updated based on the configurable settings. For example, code for the overly element may be updated with the configurable settings (e.g., to match the configurable settings).

Figure 9:
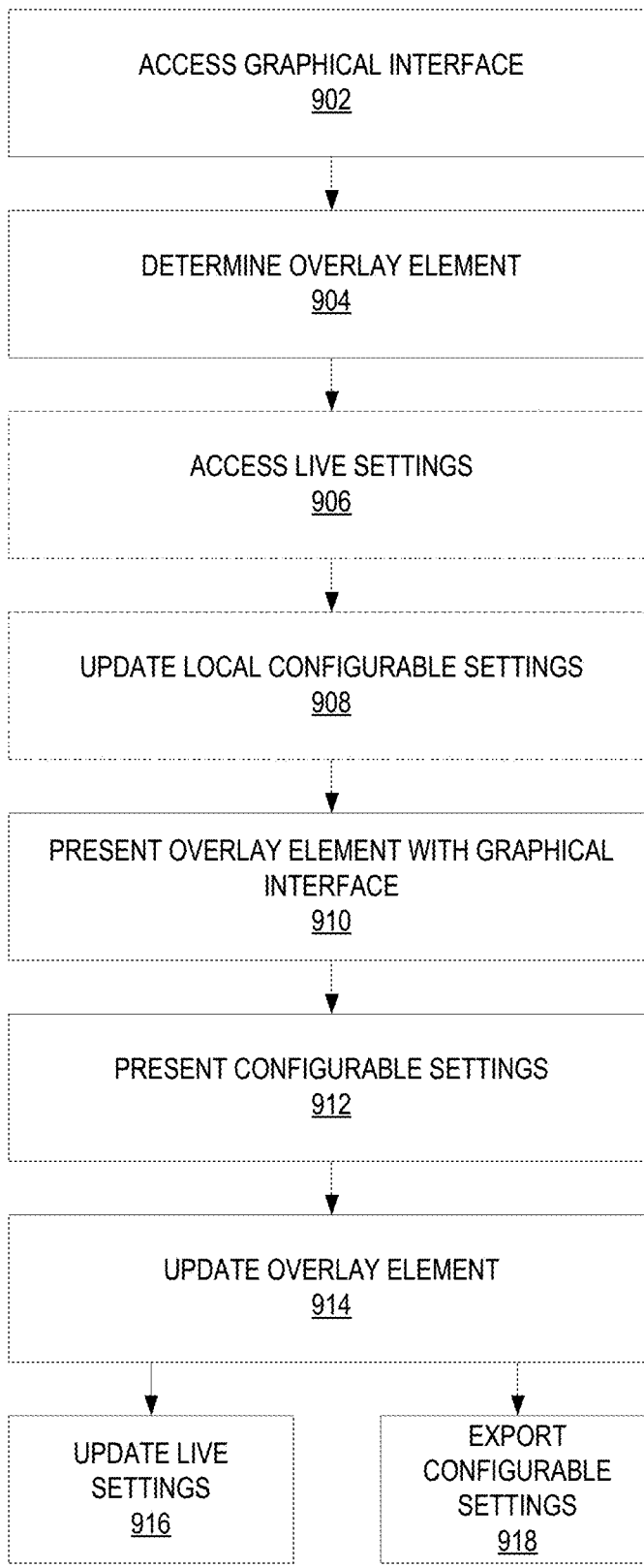
FIG. 9 is a process for updating a live overlay element from a demonstration application according to one embodiment.

FIG. 9 is a process 900 for updating a live overlay element from a demonstration application according to one embodiment. The demonstration application can be running on a computing device. At block 902, a graphical interface can be accessed. The graphical interface accessed at block 902 can be a live webpage. The live webpage can include a live overlay element that has already been incorporated into the live webpage. At block 904, an overlay element can be determined as described above.

At optional block 906, live settings corresponding to the live webpage can be accessed. Live settings can be accessed directly from the webpage, from a web server associated with the webpage, or from another server associated with the webpage.

At optional block 908, the local configurable settings can be updated. The local configurable settings can be updated based on the live settings accessed at block 906. Thus, the local configurable settings can be updated to be identical to the live settings corresponding to the live webpage so that the overlay element presented at block 910, below, will be visually similar, functionally similar, or both to the live overlay element.

At block 910, the overlay element can be presented with the graphical interface. If the local configurable settings were updated at block 908 with the live settings, the overlay element will be presented in a visually similar, functionally similar, or visually and functionally similar manner to the live overlay element. In some embodiments, the demonstration application is able to suppress the live overlay element from appearing in the graphical interface presented at block 910.

At block 912, configurable settings are presented and can be changed, as described above with reference to FIG. 8. At block 814, the overlay element can be updated based on the configurable settings, as described above with reference to FIG. 8.

At block 816, the live settings can be updated based on the configurable settings (e.g., local settings used to configure the local overlay element presented at block 810). The live settings can be updated by the computing device transmitting update commands or an updated settings file to a web server or other server.

In some embodiments, configurable settings can be exported at block 818. The settings can be exported as a JSON file, other markup language file, or as a human-readable list of the settings. The exported settings can be saved for future use. The exported settings can be provided to a developer as instructions to update a live webpage.

In an embodiment, the process 900 allows a client to access their own live webpage from a demonstration application, see a local overlay element running in the demonstration application, edit the configurable settings of the local overlay element, and upload the configurable settings to be used as live settings with their own live webpage. Thus, the client is able to quickly and easily update the functionality, appearance, or functionality and appearance of an overlay element running on their live webpage based on a demonstration of how the overlay element would function, appear, or function and appear given the updated settings.

Figure 10:
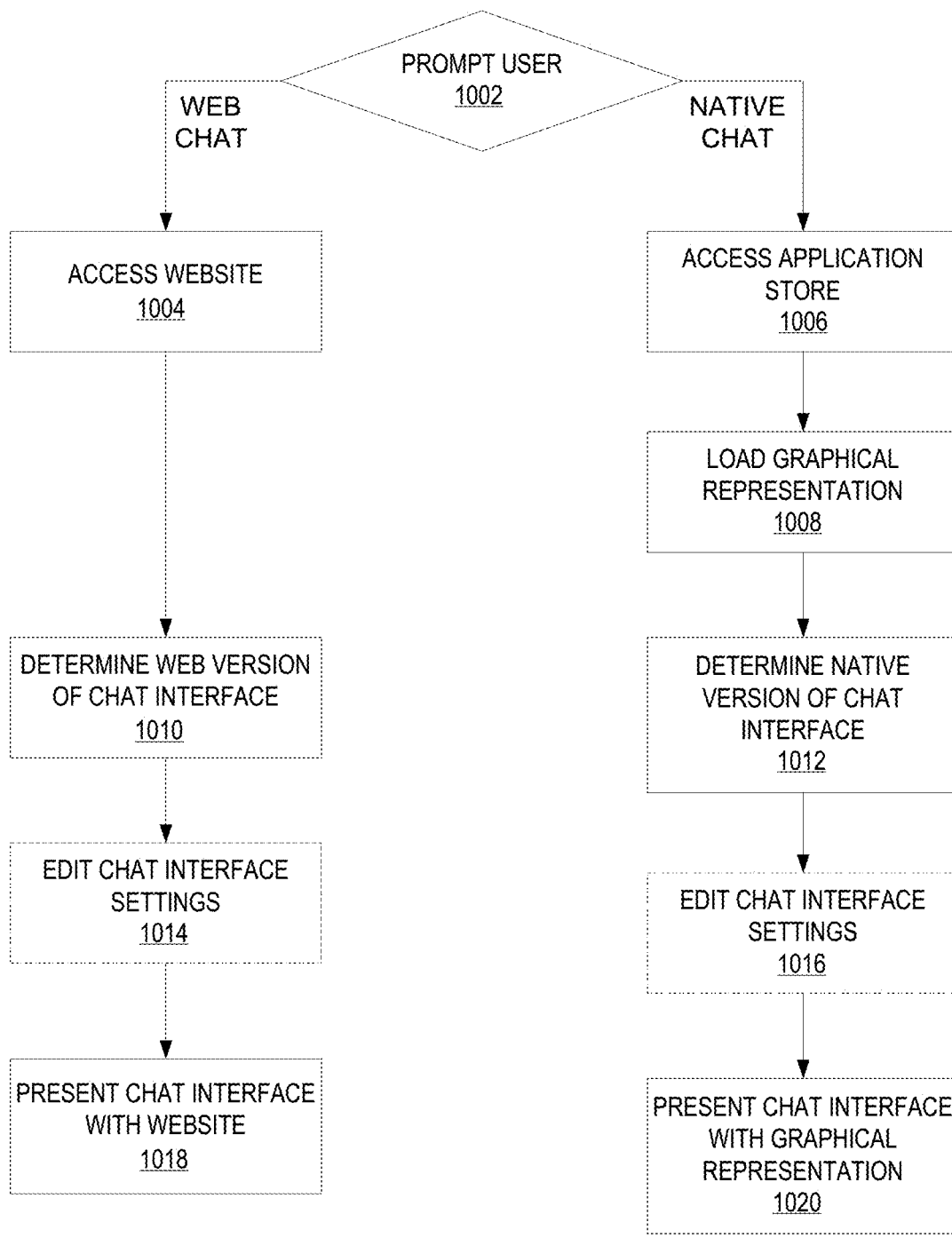
FIG. 10 is a block diagram of a process of demonstrating a chat interface as an overlay element according to one embodiment.

FIG. 10 is a block diagram of a process 1000 of demonstrating a chat interface as an overlay element according to one embodiment. A demonstration application can be running on a computing device. While the example embodied in FIG. 10 deals with live chat overlay elements, it can be applied to other overlay elements.

At block 1002, the demonstration application can prompt the user to select a web chat mode of implementation or a native chat mode of implementation.

If the user selects the web chat mode of implementation, a website can be accessed at block 1004. At block 1010, the demonstration application can determine to use a web version of the chat interface, based on the user's selection of a web chat mode of implementation. In some embodiments, the web version of the chat interface can be suitable for insertion in a website. At optional block 1014, the demonstration application can prompt the user to edit settings corresponding to the chat interface. At block 1018, the chat interface can be presented with the website. The chat interface can be presented as an overlay element as described herein. The chat interface and the website can both be fully operational.

If the user selects the native chat mode of implementation, an application store can be accessed at block 1006. Accessing the application store can include prompting the user for input (e.g., a search query) and submitting that input to the application store to identify a native application. Accessing the application store can include accessing information about a native application. At block 1008, the demonstration application can load a graphical representation based on the native application identified at block 1006. The graphical representation can be a video or image corresponding to the native application, such as a screenshot of the graphical interface of the native application. At block 1012, the demonstration application can determine to use a native version of the chat interface, based on the user's selection of a native chat mode of implementation. The native version of the chat interface can be programmed in code suitable for insertion in the code of a native application. In some embodiments, the native version can be based on an application library suitable for incorporation into a native application. At optional block 1016, the demonstration application can prompt the user to edit settings corresponding to the chat interface. At block 1020, the chat interface can be presented with the graphical representation. The chat interface can be presented as an overlay element as described herein. The chat interface can be fully operational and interactive, while the graphical representation can be a non-interactive image or video.

Figure 11:
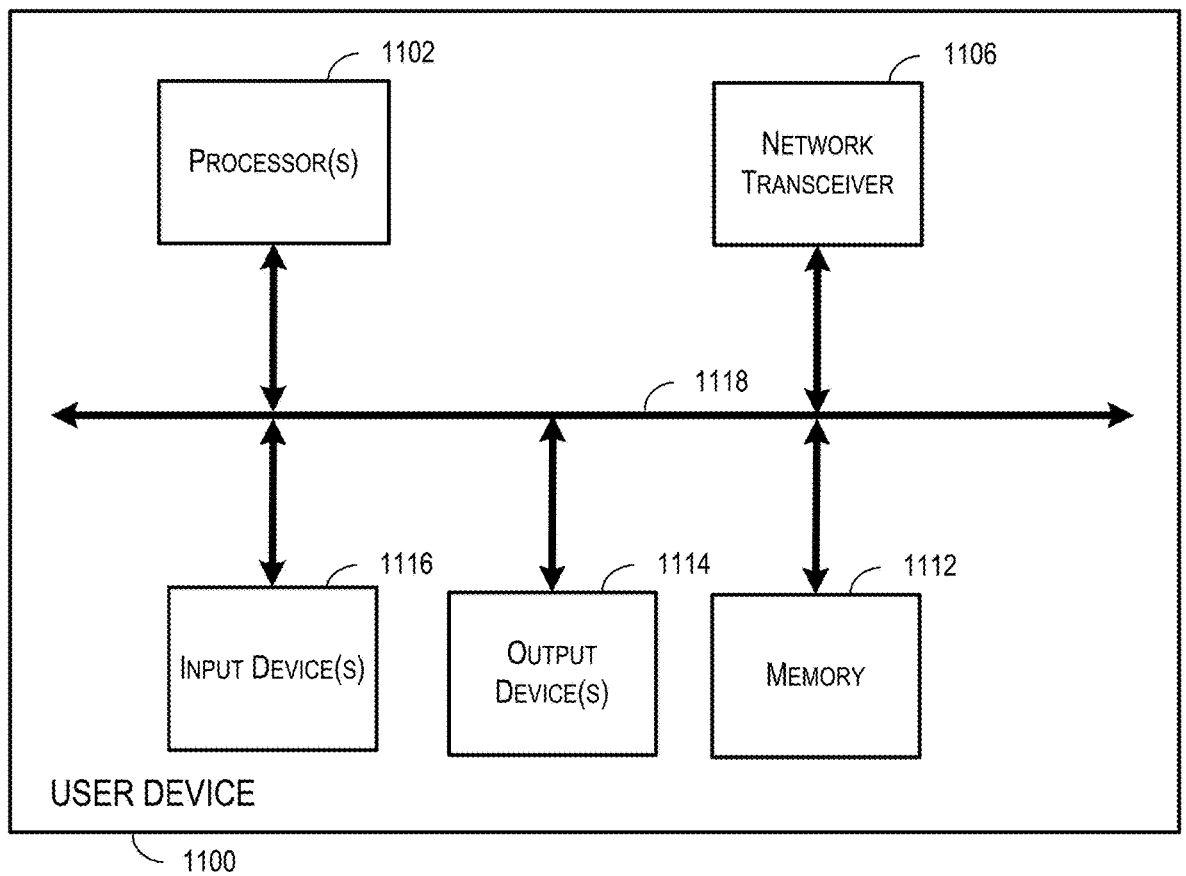
FIG. 11 illustrates an example of a user device according to one embodiment.

FIG. 11 illustrates an example of a user device 1100 (e.g., computing device) according to one embodiment. The user device 1100 may include any human-to-machine interface with network connection. The user device 1100 can have capability that allows accessing of a webpage. For example, the user device 1100 may include a cellular telephone, a smartphone, a desktop computer, a laptop computer, a tablet, a personal digital assistant (PDA), or any other suitable device. The user device 1100 can include hardware elements that can be electrically coupled via a bus 1118 (or may otherwise be in communication, as appropriate). In one embodiment, the bus 1118 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like); one or more input devices 1116, which can include without limitation a camera, a mouse, a keyboard, a touch sensitive screen, a touch pad, a keypad, and/or the like; and one or more output devices 1114, which can include, without limitation, a display, a printer, and/or the like.

The user device 1100 may include one or more network transceivers 1106 connected to the bus 1118. The network transceiver 1106 may be operable to send and/or receive signals across a network connection, such as to and/or from a cloud or the Internet.

The user device 1100 may further include (and/or be in communication with) one or more non-transitory machine-readable storage mediums or storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1112, such as RAM, ROM, FLASH, or disc drive, and executed by processor(s) 1102. The user device 1100 can also comprise software elements (e.g., located within the memory 1112), including, for example, an operating system, device drivers, executable libraries, and/or other code, such as one or more application programs, which may comprise computer programs implementing various functions. Such functions or code may include code to perform the steps described above with respect to FIGS. 7-10 and FIGS. 13-14. Memory 1112 may be a non-transitory machine-readable storage medium, processor-readable memory, and/or a computer-readable memory that stores the one or more computer-program products configured to cause the processor(s) 1102 to perform the various functions. In other embodiments, the various functions described may be performed in hardware.

Figure 12:
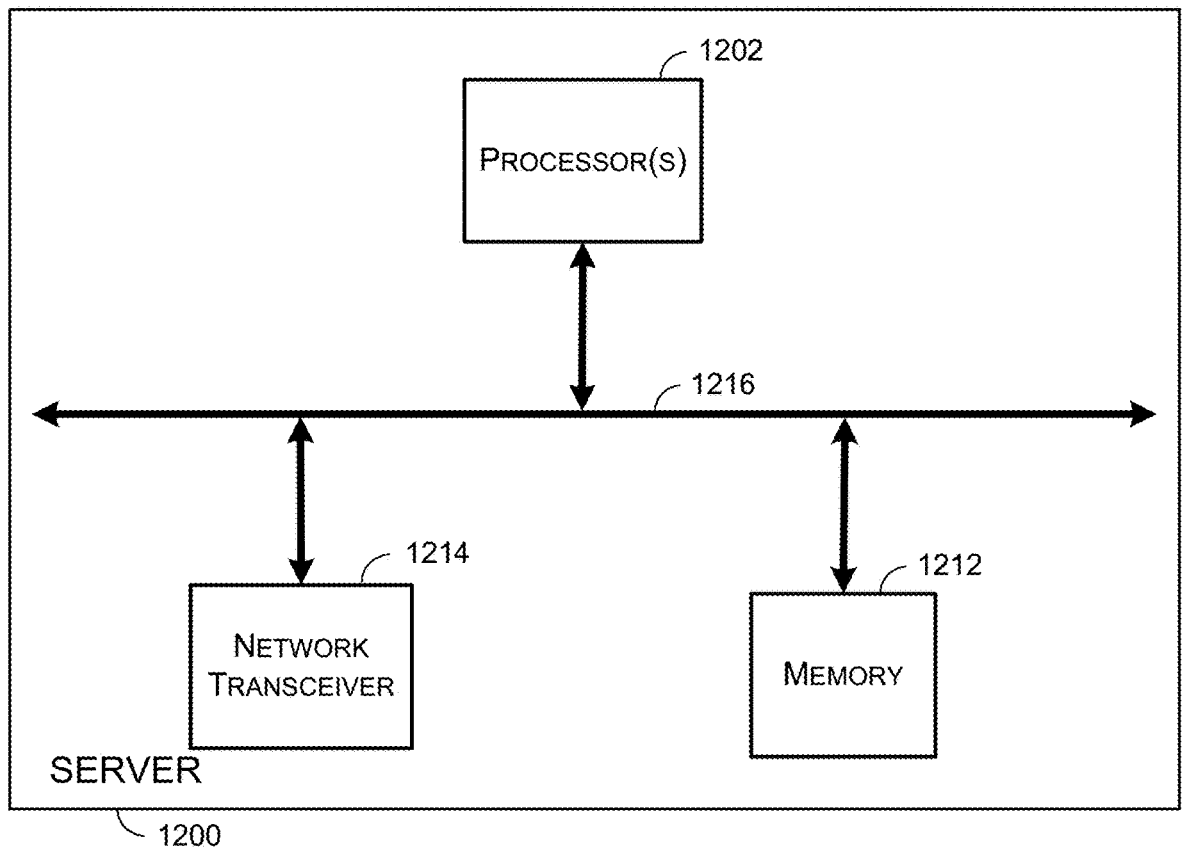
FIG. 12 illustrates an example of a server, such as a web server or a code server, according to one embodiment.

FIG. 12 illustrates an example of a server 1200, such as a web server or an app server, according to one embodiment. An application store can also be a server 1200. The server 1200 can include hardware elements that can be electrically coupled via a bus 1216 (or may otherwise be in communication, as appropriate). In one embodiment, the bus 1216 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like), memory 1212, a bus 1216, and a network transceiver 1214. The network interface 1214 can enable communication with a network (e.g., a cloud or the Internet).

The server 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1212. The server 1200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a computing device (or other device) to perform one or more operations in accordance with the described methods. Such functions or code may include code to perform the steps described above with respect to FIGS. 7-10 and FIGS. 13-14. The memory 1212 may be a non-transitory machine-readable storage medium, processor-readable memory, and/or a computer-readable memory that stores the one or more computer-program products configured to cause the processor(s) 1202 to perform the functions described. In other embodiments, one or more of the functions described may be performed in hardware.

A set of these instructions and/or code might be stored on a non-transitory machine-readable storage medium, such as the memory 1212. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a computing device with the instructions/code stored thereon. These instructions of one or more computer-program products might take the form of executable code, which is executable by the server 1200 and/or might take the form of source and/or installable code, which, upon compilation and/or installation on the server 1200 (e.g., using any of a variety of generally available compilers, installation programs, compression/decompression utilities, etc.) then takes the form of executable code.

Figure 13:
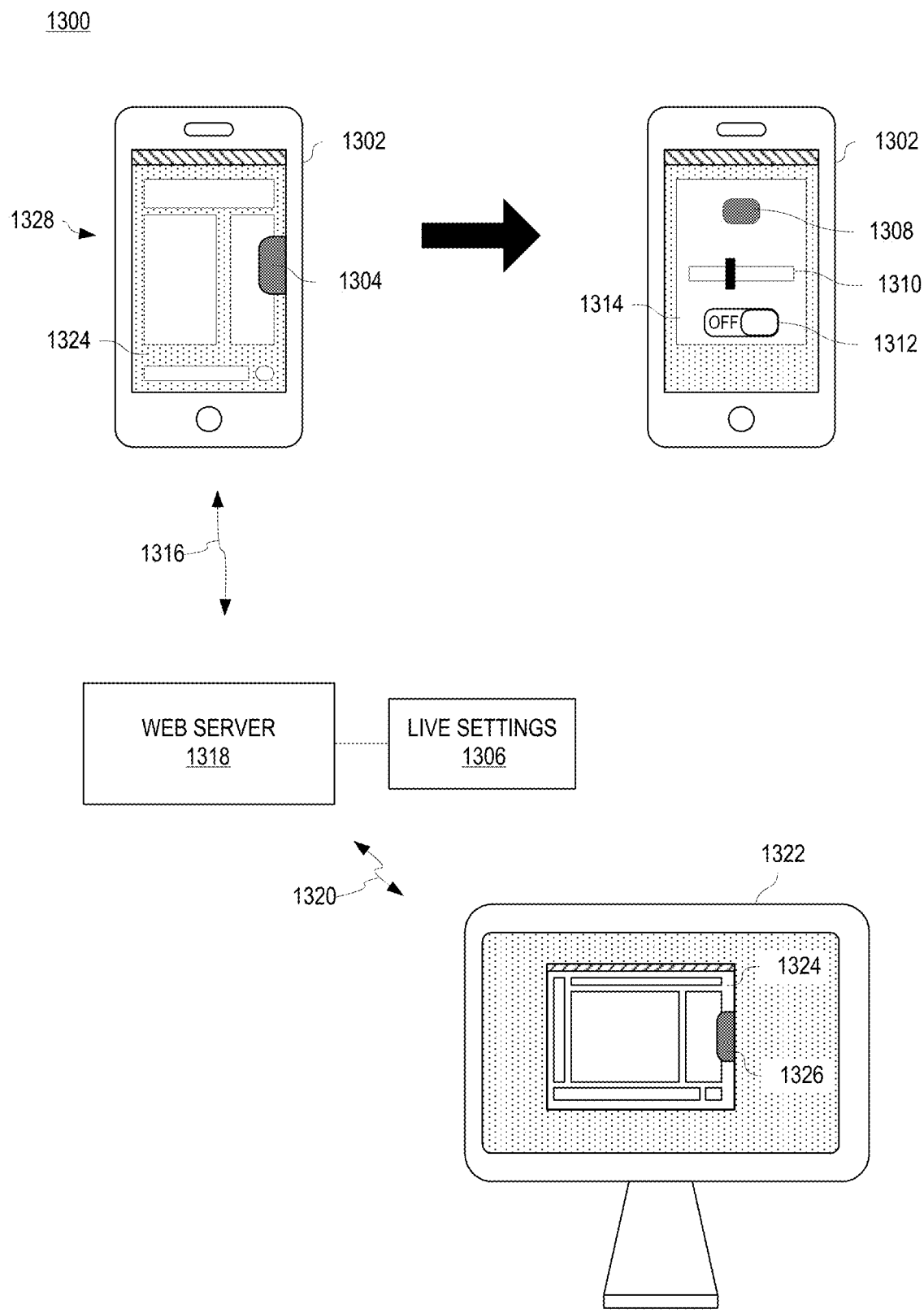
FIG. 13 is a block diagram of an overlay element demonstration process according to one embodiment.

FIG. 13 is a block diagram of an overlay element demonstration process 1300 according to one embodiment. A computing device 1322 is shown accessing a web server 1318 through a first data connection 1320. The computing device 1322 is able to load a live website 1324 that includes a live overlay element 1326.

A user device 1302 can access the same web server 1318 through a second data connection 1316. The user device 1302 can be running a demonstration application 1328 that is able to load the live webpage 1324. In some embodiments, the demonstration application 1328 can load the live webpage 1324 while suppressing the live overlay element 1326. The demonstration application 1328 can present a local overlay element 1304. The functionality, appearance, or functionality and appearance of the local overlay element 1304 can be based on configurable settings. The demonstration application 1328 can cause the user device 1302 to obtain live settings 1306 from the web server 1318 through the second data connection 1316 and update the local settings of the local overlay element 1304 with the live settings 1306.

The user device 1302 can display a local settings pane 1314. The local settings pane 1314 can allow the user to adjust the local settings. Examples of local settings include a color setting 1308, a size setting 1310, and a secondary feature setting 1312. Other settings can be used and set. The color setting 1308, size setting 1310, and secondary feature setting 1312 can be updated based on the live settings 1306 from the web server 1318. In FIG. 13, the color setting 1308 can be a first color, the size setting 1310 can be a medium size, and the secondary feature setting 1312 can be off. The color setting 1308 and size setting 1310 can represent settings that change the appearance of the overlay element 1304. The secondary feature setting 1312 can represent settings that change the functionality of the overlay element 1304.

Figure 14:
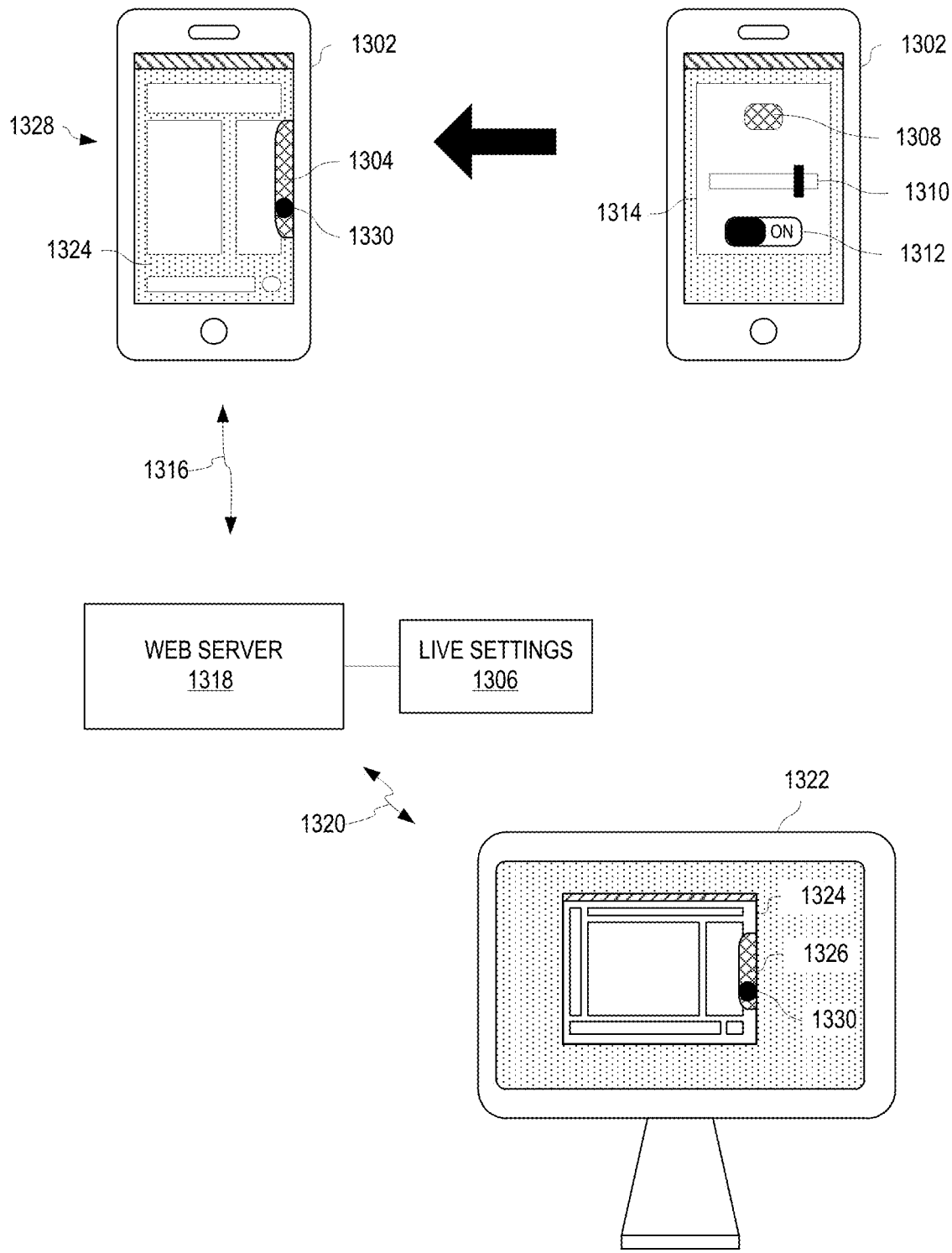
FIG. 14 is a block diagram of an overlay element updating process based on the overlay element demonstration process of FIG. 13 according to one embodiment.

FIG. 14 is a block diagram of an overlay element updating process 1400 based on the overlay element demonstration process 1300 of FIG. 13 according to one embodiment. The settings on the local settings pane 1314 can be updated by a user. For example, the color setting 1308 can be changed to a second color, the size setting 1310 can be changed to large, and the secondary feature setting 1312 can be changed to on.

Based on the updated local settings, the overlay element 1304 presented in the demonstration application 1328 running on the user device 1302 can look and operate differently. The demonstration application can still be displaying the website 1324 and the overlay element 1304. The change in color setting 1308 can correspond to a change in the color of the overlay element 1304. The change in size setting 1310 can correspond to a change in the length of the overlay element 1304. The change in the secondary feature setting 1312 can correspond to the presence of a secondary button 1330 on the overlay element 1304. Other settings and other changes can be used.

The user device 1302 can upload the local settings, through the second data connection 1316, to the web server 1318 to update the live settings 1306. The live settings 1306 can now contain the settings that have been changed by the user.

Now, when a computer 1322 accesses the web server 1318 through the first data connection 1320, the computer will load the webpage 1324 and the live overlay element 1326. However, since the functionality and appearance of the live overlay element 1326 is based on the live settings 1306, the live overlay element 1326 will have the change color set by the color setting 1308, the changed size set by the size setting 1310, and the secondary button 1330 set by the secondary function setting 1312. Thus, the user device 1302 is able to demonstrate settings changes in a local overlay element 1304, and then update live settings 1306 so that other users can experience those same changes in the live overlay element 1326.

FIGS. 15-40 are depictions of screenshots that may appear on a computing device, such as on a smartphone.

FIG. 15 is a depiction of a selection screen 1500 displayable on a computing device according to one embodiment. On the selection screen 1500, the computing device provides options for selecting the mode of implementation. The selection screen 1500 can include a web chat button 1502 and a native chat button 1504. Upon selecting the web chat button 1502, the computing device can load a URL entry screen 1600. Upon selecting the native chat button 1504, the computing device can load a native app search screen 2600.

FIG. 16 is a depiction of a URL entry screen 1600 displayable on a computing device according to one embodiment. The URL entry screen 1600 can prompt a user to enter a URL of a web site to load along with an overlay element. The URL entry screen 1600 can include a URL field 1604 in which a URL entered. A keyboard 1606 can be presented for entering characters into the URL field 1604. After a URL is entered into the URL field 1604, a user can select the next button 1602 to cause the computing device to load a web chat initial settings screen 1700.

FIG. 17 is a depiction of a web chat initial settings screen 1700 displayable on a computing device according to one embodiment. The web chat initial settings screen 1700 allows the entry of various settings that will be used to initially load the demonstration screen 1800. The web chat initial settings screen 1700 can include a browser selector 1704, a conversion tracking switch 1706, a surveys switch 1708, and a show tab selector 1710. The browser selector 1704 can allow a user to select which browser will be used to load the webpage in the demonstration screen 1800. The conversion tracking switch 1706 can allow a user to enable or disable conversion tracking on the overlay element. The surveys switch 1708 can allow a user to enable or disable a prompt for survey entries before or after entering a live chat. The show tab selector 1710 can allow a user to select the level of depth in a website before the live chat tab will be shown. For example, setting the show tab selector 1710 to "all" will display the live chat tab on all pages of the website. However, setting the show tab selector 1710 to "deep" or "deeper" will only show the live chat tab on successively deeper links into the webpage (e.g., after clicking one, two, or more links within a website). Upon selecting the done button 1702, the computing device can load a demonstration screen 1800.

FIG. 18 is a depiction of a demonstration screen 1800 displayable on a computing device according to one embodiment. The demonstration screen can 1800 can include a live webpage 1804 presented along with a live chat tab 1802. The live chat tab 1802 can be presented as an overlay element. The live webpage 1804 can be live and fully interactive. A user can navigate the webpage 1804 and operate any interactive elements of the webpage 1804, such as buttons and links. Likewise, the live chat tab 1802 is live and interactive. When a user selects the live chat tab 1802, the computing device can load a pre-chat survey window 1902.

Figures 19, 20:
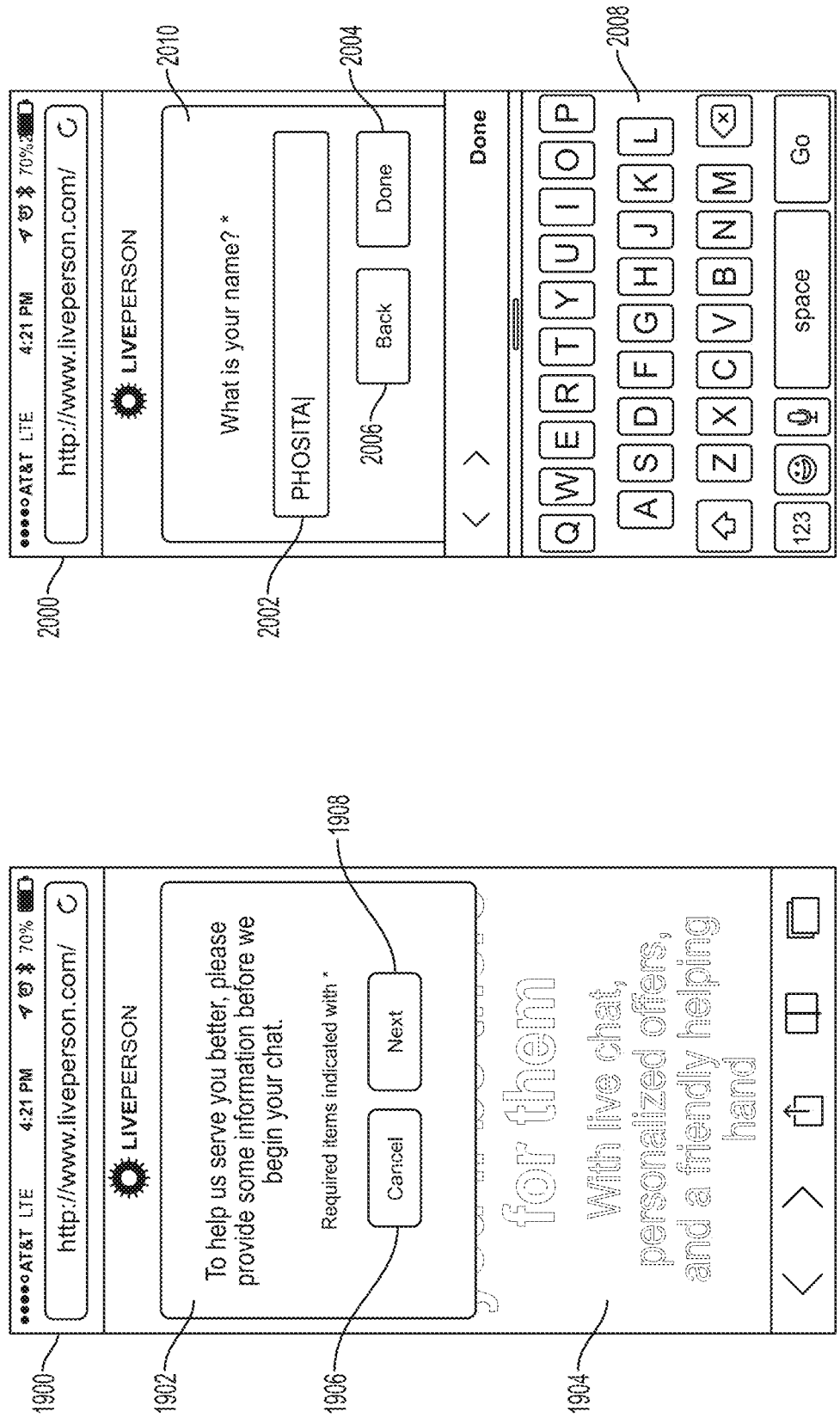
FIG. 19 is a depiction of a demonstration screen with a pre-chat survey window displayable on a computing device according to one embodiment.
FIG. 20 is a depiction of a demonstration screen with a name entry window displayable on a computing device according to one embodiment.

FIG. 19 is a depiction of a demonstration screen 1900 with a pre-chat survey window 1902 displayable on a computing device according to one embodiment. The pre-chat survey window 1902 may be presented over the live webpage 1904. The live webpage 1904 can be partially obscured, such as through blurring, fading, or overlaying a translucent color. The pre-chat survey window 1902 can include a cancel button 1906, which when pressed causes the computing device to dismiss the pre-chat survey window 1902. The pre-chat survey window 1902 can further include a next button 1908, which when pressed causes the computing device to load a name entry window 2010.

FIG. 20 is a depiction of a demonstration screen 2000 with a name entry window 2010 displayable on a computing device according to one embodiment. The name entry window 2010 may be presented over the live webpage. The name entry window 2010 can include a name entry box 2002 into which a user can type his or her name for identification purposes during the live chat. A keyboard 2008 can be displayed for the purposes of entering characters into the name entry box 2002. The name entry window 2010 can include a back button 2006, which when pressed can cause the computing device to dismiss the name entry window 2010. The name entry window 2010 can further include a done button 2004, which when pressed can cause the computing device to load a chat overlay 2114.

Figure 21:
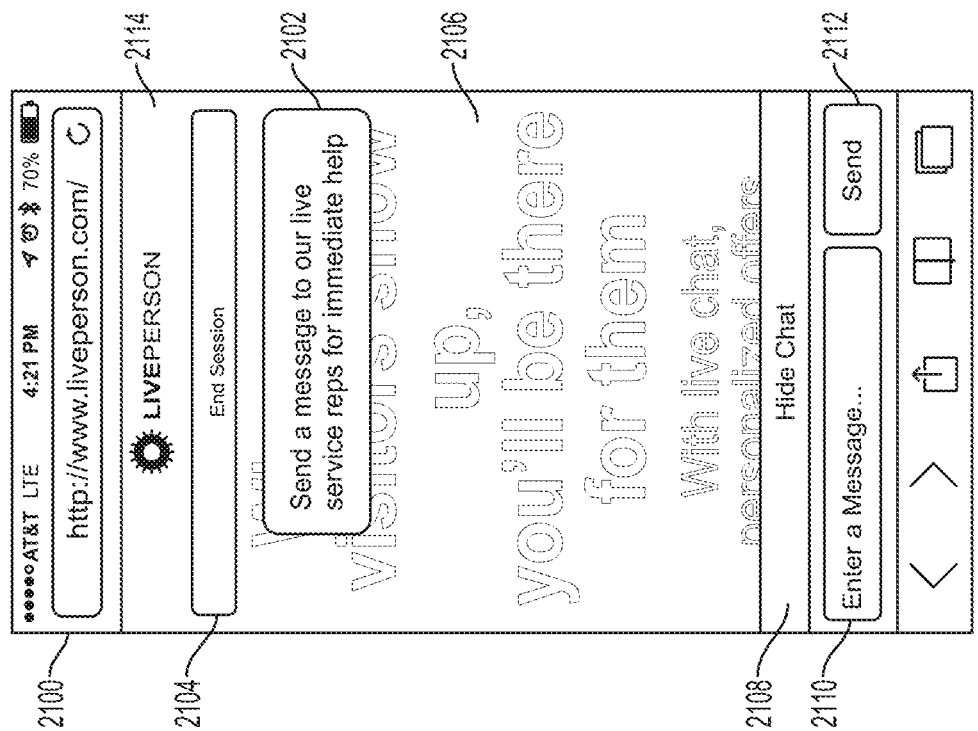
FIG. 21 is a depiction of a demonstration screen with a chat overlay displayable on a computing device according to one embodiment.

FIG. 21 is a depiction of a demonstration screen 2100 with a chat overlay 2114 displayable on a computing device according to one embodiment. Upon loading the chat overlay 2114, the computing device can either establish a new chat connection or continue an already existing chat connection. The chat overlay 2114 can enable a user to interact with an agent through a live chat. The chat overlay 2114 can be presented over the live webpage 2106. The live webpage 2106 can be obscured as described above. The chat overlay 2114 can include an end session button 2104, which when pressed can cause the computing device to dismiss the chat overlay 2114 and terminate the chat connection. The chat overlay 2114 can include a message bubble 2102 including information pertaining to the live chat. Similar message bubbles can be used to display sent and received messages. The chat overlay 2114 can include a hide chat button 2108, which when pressed causes the computing device to dismiss the chat overlay 2114 without terminating the chat connection, allowing a user to resume the chat connection at a later time. The chat overlay 2114 can further include a message box 2110 into which messages may be typed, as well as a send button 2112, which when pressed can cause the computing device to transmit any message typed into the message box 2110.

Figure 22:
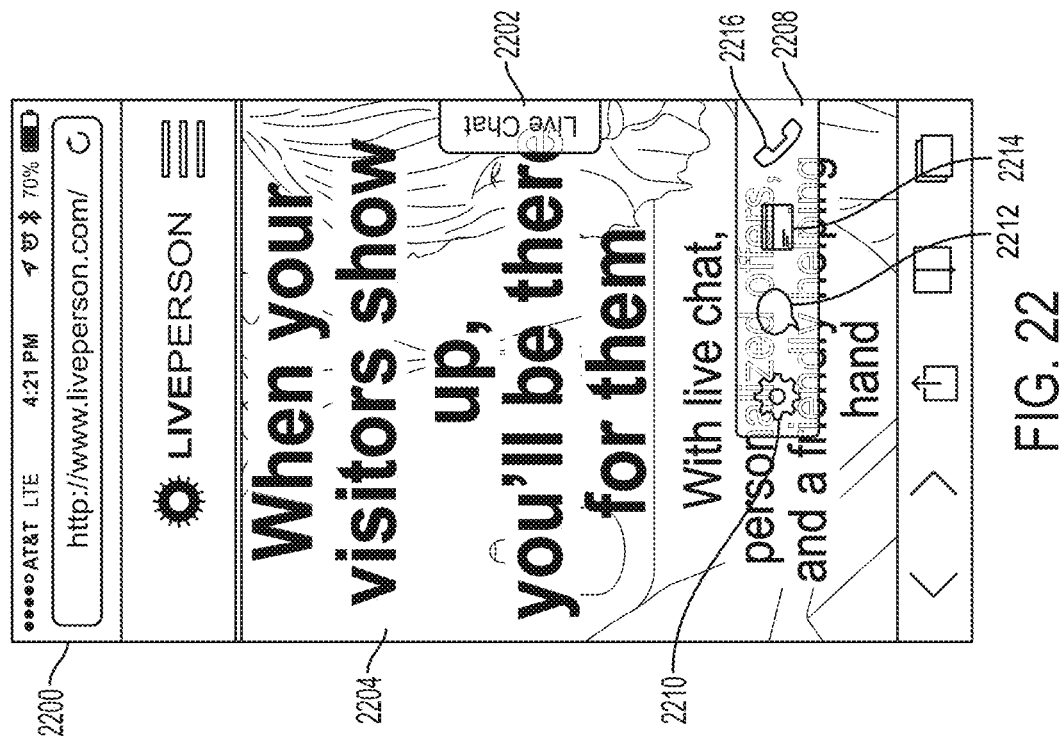
FIG. 22 is a depiction of a demonstration screen with a function bar displayable on a computing device according to one embodiment.

FIG. 22 is a depiction of a demonstration screen 2200 with a function bar 2208 displayable on a computing device according to one embodiment. Demonstration screen 2200 can display a function bar 2208 upon receiving a specified input from a user, such as after a user swipes across the demonstration screen 2200. Other specified inputs can be used, such as input from an accelerometer when the user shakes the computing device. Upon receiving the specified input, the function bar 2208 can appear. The function bar 2208 can contain buttons for using or configuring the demonstration application itself. The function bar 2208 can include a chat button 2212, which when pressed can cause the computing device to open the chat overlay 2114 without the need for the user to press the live chat tab 2202, thus bypassing the live chat tab 2202. The function bar 2208 can include a purchase button 2214, which when pressed can cause the computing device to simulate a purchase made on the live website 2204, for the purpose of demonstrating functionality of the overlay element (e.g., when the overlay element is capable of detecting purchases). The function bar 2208 can include a call button 2216, which can be used to simulate a phone call being made from the live website 2204, or can be used to initiate a live phone call, such as to a representative of the company supplying the demonstration application. The function bar 2208 can include a settings button 2210, which when pressed can cause the computing device to load a settings screen 2300.

FIG. 23 is a depiction of a settings screen 2300 displayable on a computing device according to one embodiment. The settings screen 2300 can contain various settings 2304, which can correspond to settings of how the demonstration application operates, how the overlay element operates, and how the overlay element appears. The settings screen 2300 can include a type setting 2306, allowing a user to switch between a web chat mode of implementation and a native chat mode of implementation. Changing the mode of implementation can also effect what settings are displayed on the settings screen 2300. The settings screen 2300 can include a URL entry box 2308, allowing a user to change the website which will be accessed and displayed in a demonstration screen. The settings screen 2300 can also include a browser selector 2310, allowing a user to change which browser is used to display the live webpage in the demonstration screen. The settings screen 2300 can include other settings. The settings screen 2300 can include a demo button 2302, which when pressed can cause the computing device to load a demonstration screen using the current settings.

FIG. 24 is a depiction of a selection screen 2400 showing new URL and browser selections displayable on a computing device according to one embodiment. Selection screen 2400 is the selection screen 2300 of FIG. 23, showing a new URL entered into the URL entry box 2404 and a new browser selected in the browser selector 2406. When the demo button 2402 is pressed, the computing device will load demonstration screen 2500.

FIG. 25 is a depiction of a selection screen 2500 displayable on a computing device according to one embodiment. Demonstration screen 2500 includes a live webpage 2504 corresponding to the URL entered into the URL entry box 2404. The live webpage 2504 is being displayed within the browser 2502 selected in the browser selector 2406. Demonstration screen 2500 displays the live webpage 2504 along with the live chat tab 2506.

FIG. 26 is a depiction of a native app search screen 2600 displayable on a computing device according to one embodiment. When a user selects the native chat button 1504, the computing device can load the native app search screen 2600. The native app search screen 2600 can include a query box 2604 into which a user can enter a search query, such as the name of a native application. A keyboard 2610 can be used to enter characters into the query box 2604. The native app search screen 2600 can include a store selector 2606, which when pressed can cause the computing device to load a store selection screen 2700. The store selector 2606 can default to the a default store available on the computing device, such as an app store specific for the region in which the computing device is used. The native app search screen 2600 can include a previous app button 2608, which when pressed can cause the computing device to load an app settings screen 2900 using the app that was previously used. The native app search screen 2600 can include a next button 2602, which when pressed can cause the computing device to load an app selection screen 2800 based on the search query typed into the query box 2604 and the store selected in the store selector 2606.

Figures 27, 28:
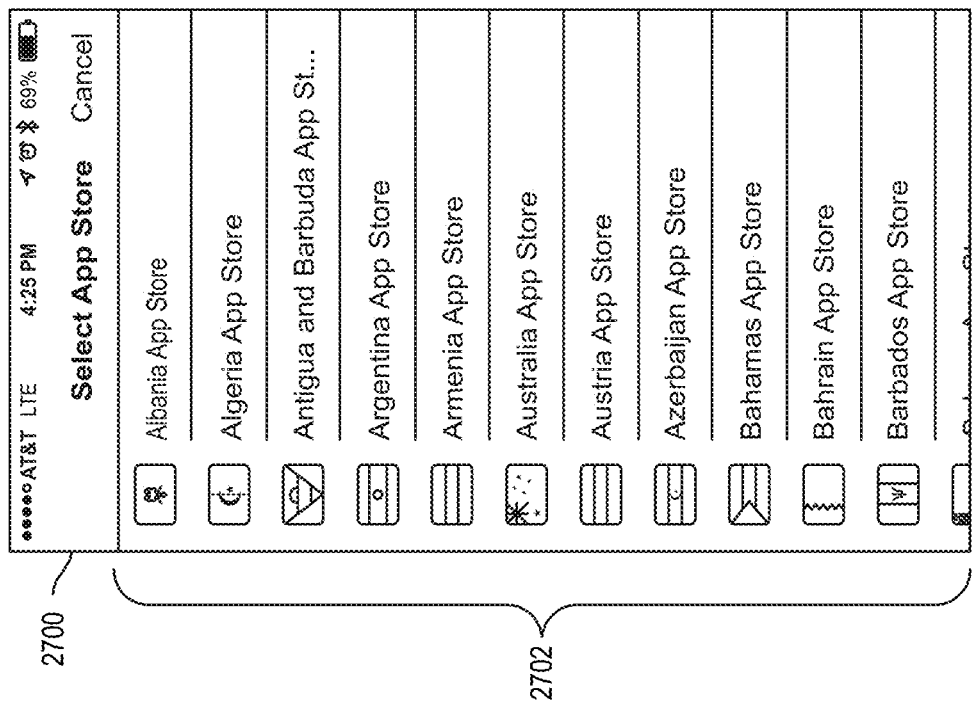
FIG. 27 is a depiction of a store selection screen displayable on a computing device according to one embodiment.
FIG. 28 is a depiction of an app selection screen displayable on a computing device according to one embodiment.

FIG. 27 is a depiction of a store selection screen 2700 displayable on a computing device according to one embodiment. The store selection screen 2700 can include numerous native app stores 2702 available to be searched. For example, there may exist separate native app stores 2702 for various countries or regions, which can be selected. In other examples, there may exist separate native app stores 2702 provided by various providers, which can be selected. When one of the native app stores 2702 is selected, the computing device can load the native app search screen 2600 and show the selected store in the store selector 2606.

FIG. 28 is a depiction of an app selection screen 2800 displayable on a computing device according to one embodiment. The app selection screen 2800 can display a list of native apps 2802 that both match the search query from the query box 2604 and are available in the app store selected in the store selector 2606. The closest matching native app 2804 can be at the top of the list of native apps 2802. When a user selects an app, such as the closest matching native app 2804, the computing device can load an app settings screen 2900 based on the selected app. Additionally, when the user selects an app, the computing device can access and download the graphical representations corresponding to the selected app that are available in the app store.

FIG. 29 is a depiction of an app settings screen 2900 displayable on a computing device according to one embodiment. The app settings screen 2900 can include a graphical representation selector 2904, which can allow a user to select which graphical representations (e.g., images or videos) are to be used in the demonstration screen 3300. As seen in FIG. 29, the graphical representation selector 2904 presently shows three selected graphical representations 2906 and two non-selected graphical representations 2908. The graphical representations available to be selected can be obtained from the app store as described above. In some embodiments, the graphical representations can be obtained from photos or screenshots stored on the computing device (e.g., if a user had previously opened an app and taken a screenshot of the app). The app settings screen 2900 can include various settings 2910, which can control the appearance or functionality of the demonstration app or the overlay element. The app settings screen 2900 can include a done button 2902, which when pressed can cause the computing device to load demonstration screen 3300.

FIG. 30 is a depiction of an initial settings screen 3000 displayable on a computing device according to one embodiment. Initial settings screen 3000 is an extension of initial settings screen 2900, available by scrolling downwards. Additional settings 3004 can be presented, which can control the appearance or functionality of the demonstration app or the overlay element.

Figure 31:
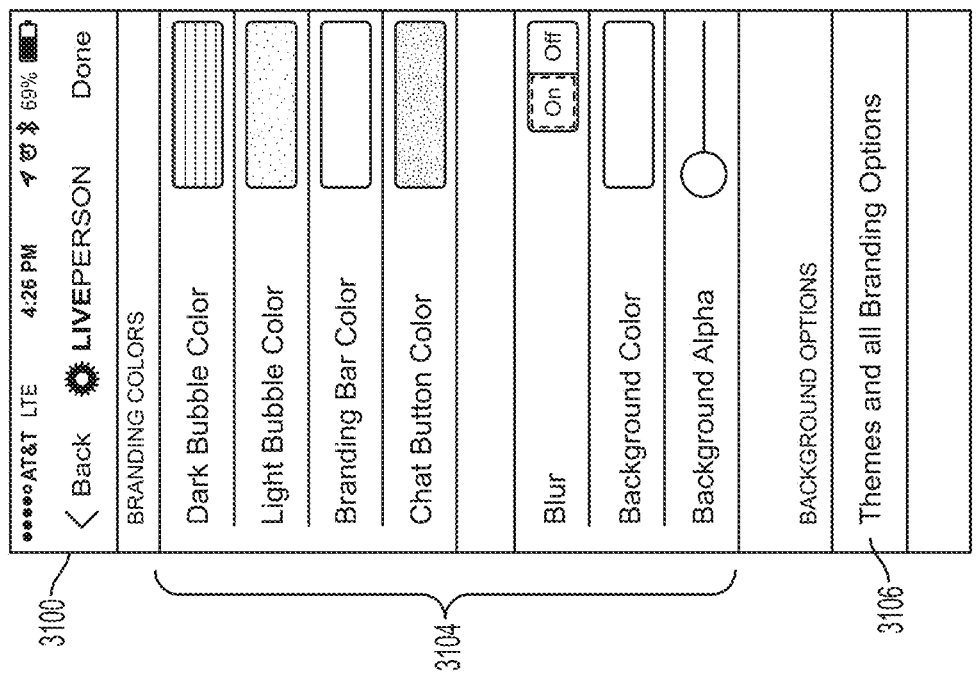
FIG. 31 is a depiction of an initial settings screen displayable on a computing device according to one embodiment.

FIG. 31 is a depiction of an initial settings screen 3100 displayable on a computing device according to one embodiment. Initial settings screen 3100 is an extension of initial settings screen 3000, available by scrolling downwards. Additional settings 3104 can be presented, which can control the appearance or functionality of the demonstration app or the overlay element. The initial settings screen 3100 can include a themes and branding button 3106, which when pressed can cause the computing device to load a branding screen 3200.

Figure 32:
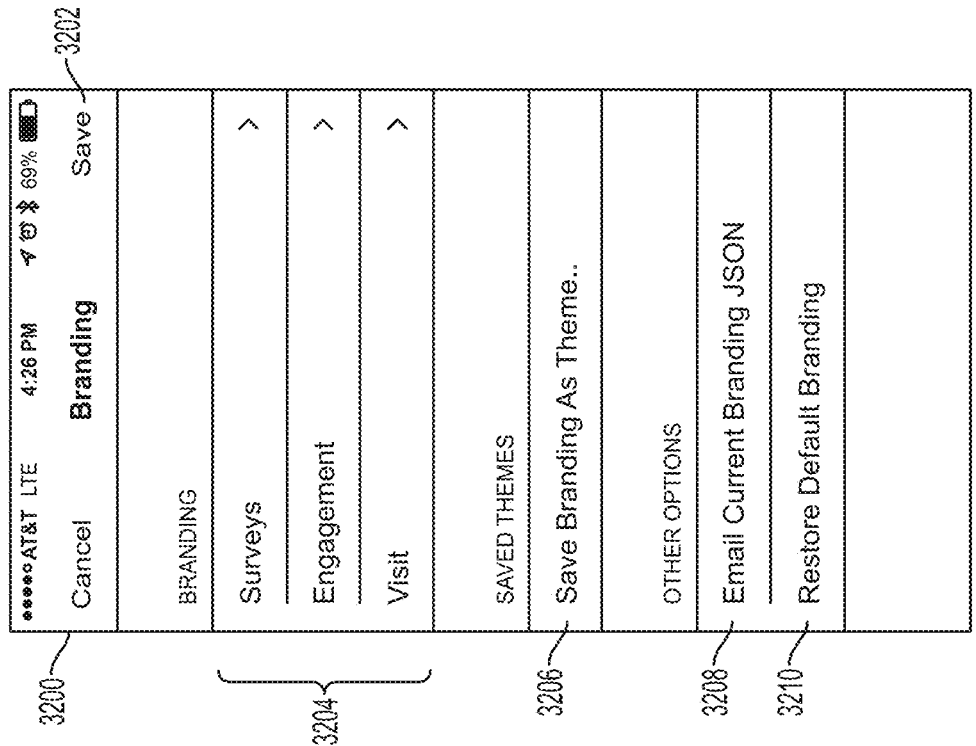
FIG. 32 is a depiction of a branding screen displayable on a computing device according to one embodiment.

FIG. 32 is a depiction of a branding screen 3200 displayable on a computing device according to one embodiment. The branding screen 3200 can contain buttons and menus that can be used to make branding customizations and make use of the customizations. The branding screen 3200 can have branding menus 3204, each of which can be used to control the appearance and functionality of different aspects of the overlay element. The branding screen 3200 can include a save button 3206, which when pressed can cause the computing device to save the current settings, branding customizations, or both as a theme, which can be exported or recalled at a later time. The branding screen 3200 can include an email button 3208, which when pressed can cause the computing device to generate an email draft containing the settings, branding customizations, or both. The email draft can be generated in the form of a JSON file. The email draft can be sent using a suitable email app on the computing device. The branding screen 3200 can include a restore button 3210, which when pressed can cause the computing device to restore the settings, branding customizations, or both to default settings. The branding screen 3200 can include a save button 3202, which when pressed can cause the computing device to save any changed branding customizations and return to the app settings screen 2900.

Figure 33:
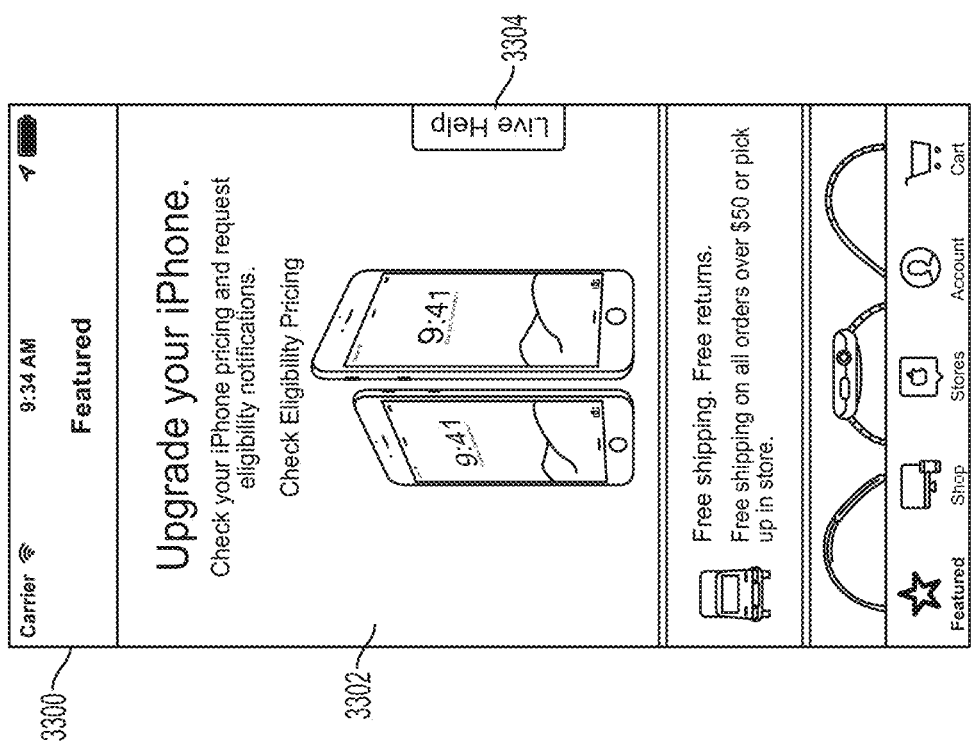
FIG. 33 is a depiction of a demonstration screen displayable on a computing device according to one embodiment.

FIG. 33 is a depiction of a demonstration screen 3300 displayable on a computing device according to one embodiment. The demonstration screen 3300 can present a native app representation 3302 along with a live chat tab 3304. The native app representation 3302 can be based on the selected graphical representations 2906. The user can switch which of the selected graphical representations 2906 is displayed as the native app representation 3302 by providing a suitable input, such as swiping across the touchscreen of the computing device.

Figure 34:
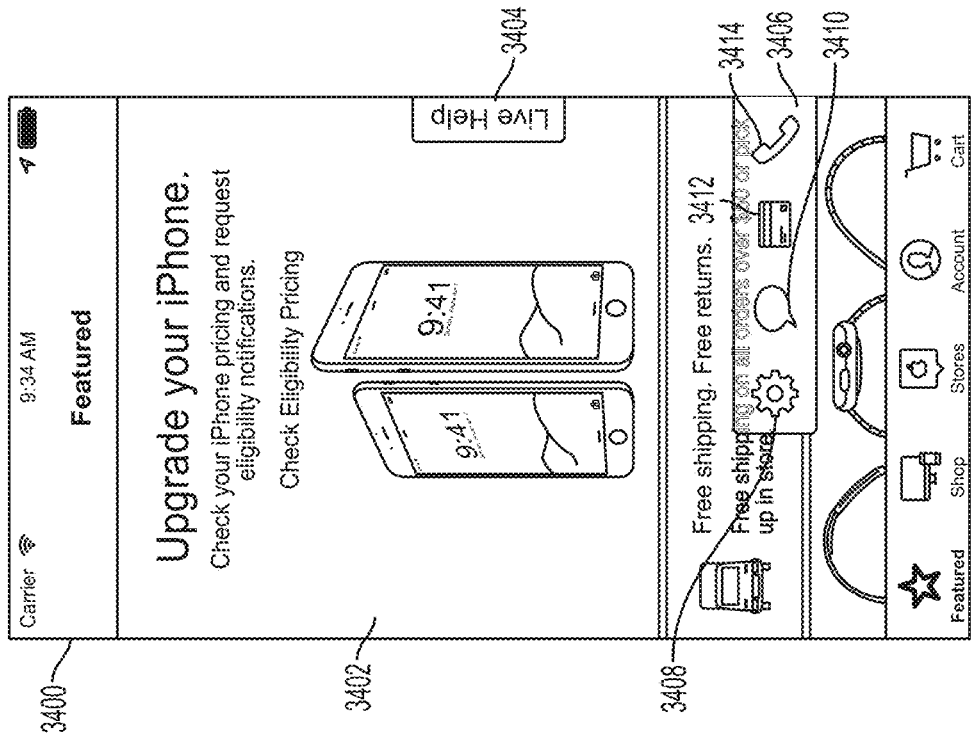
FIG. 34 is a depiction of a demonstration screen with a function bar displayable on a computing device according to one embodiment.

FIG. 34 is a depiction of a demonstration screen 3400 with a function bar 3406 displayable on a computing device according to one embodiment. Demonstration screen 3400 can display a function bar 3406 upon receiving a specified input from a user, such as after a user swipes across the demonstration screen 3400. Other specified inputs can be used, such as input from an accelerometer when the user shakes the computing device. Upon receiving the specified input, the function bar 3406 can appear. The function bar 3406 can contain buttons for using or configuring the demonstration application itself. The function bar 3406 can include a chat button 3410, which when pressed can cause the computing device to open a chat overlay without the need for the user to press the live chat tab 3404, thus bypassing the live chat tab 3404. The function bar 3406 can include a purchase button 3412, which when pressed can cause the computing device to simulate a purchase made from within the native app depicted in the native app representation 3402, for the purpose of demonstrating functionality of the overlay element (e.g., when the overlay element is capable of detecting purchases). The function bar 3406 can include a call button 3414, which can be used to simulate a phone call being made from the native app depicted in the native app representation 3402, or can be used to initiate a live phone call, such as to a representative of the company supplying the demonstration application. The function bar 3406 can include a settings button 3408, which when pressed can cause the computing device to load an app settings screen 2900.

Figure 35:
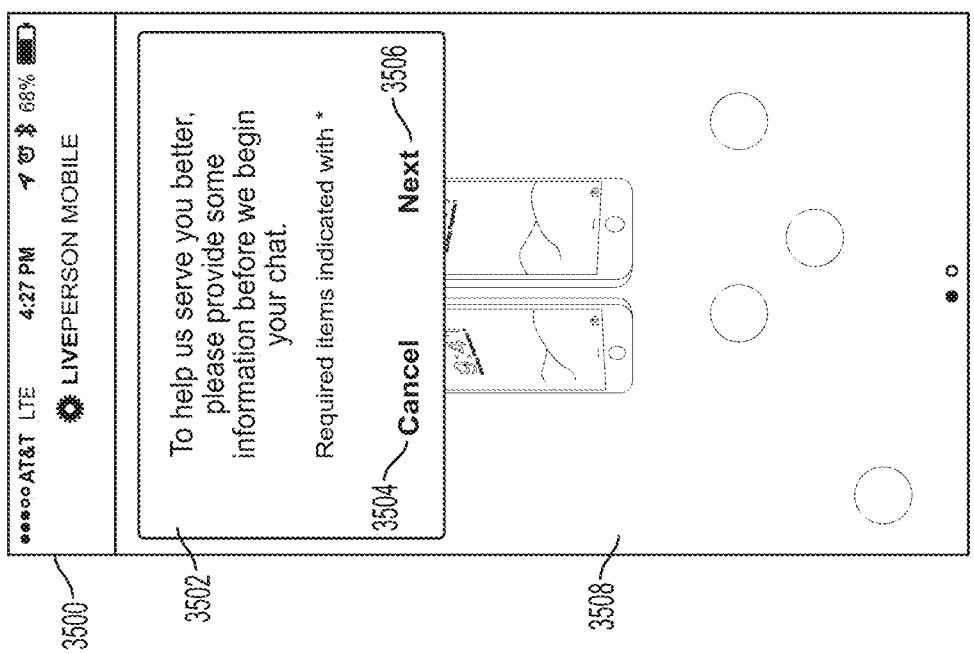
FIG. 35 is a depiction of a demonstration screen with a pre-chat survey window displayable on a computing device according to one embodiment.

FIG. 35 is a depiction of a demonstration screen 3500 with a pre-chat survey window 3502 displayable on a computing device according to one embodiment. The pre-chat survey window 3502 may be presented over the native app representation 3508. The native app representation 1904 can be partially obscured, such as through blurring, fading, or overlaying a translucent color. The pre-chat survey window 3502 can include a cancel button 3504, which when pressed causes the computing device to dismiss the pre-chat survey window 3502. The pre-chat survey window 3502 can further include a next button 3506, which when pressed causes the computing device to load a name entry window 3600.

Figure 36:
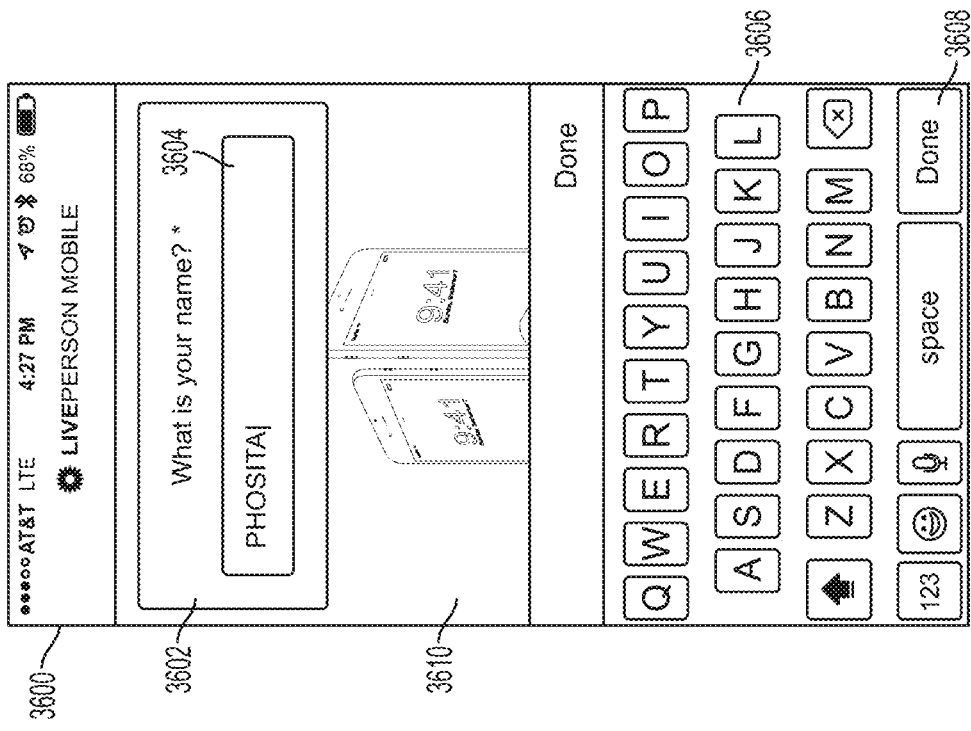
FIG. 36 is a depiction of a demonstration screen with a name entry window displayable on a computing device according to one embodiment.

FIG. 36 is a depiction of a demonstration screen 3600 with a name entry window 3602 displayable on a computing device according to one embodiment. The name entry window 3602 may be presented over the native app representation 3610. The name entry window 3602 can include a name entry box 3604 into which a user can type his or her name for identification purposes during the live chat. A keyboard 3606 can be displayed for the purposes of entering characters into the name entry box 3604. The name entry window 3602 can include a done button 3608, which when pressed can cause the computing device to load a chat overlay 3802.

Figures 37, 38:
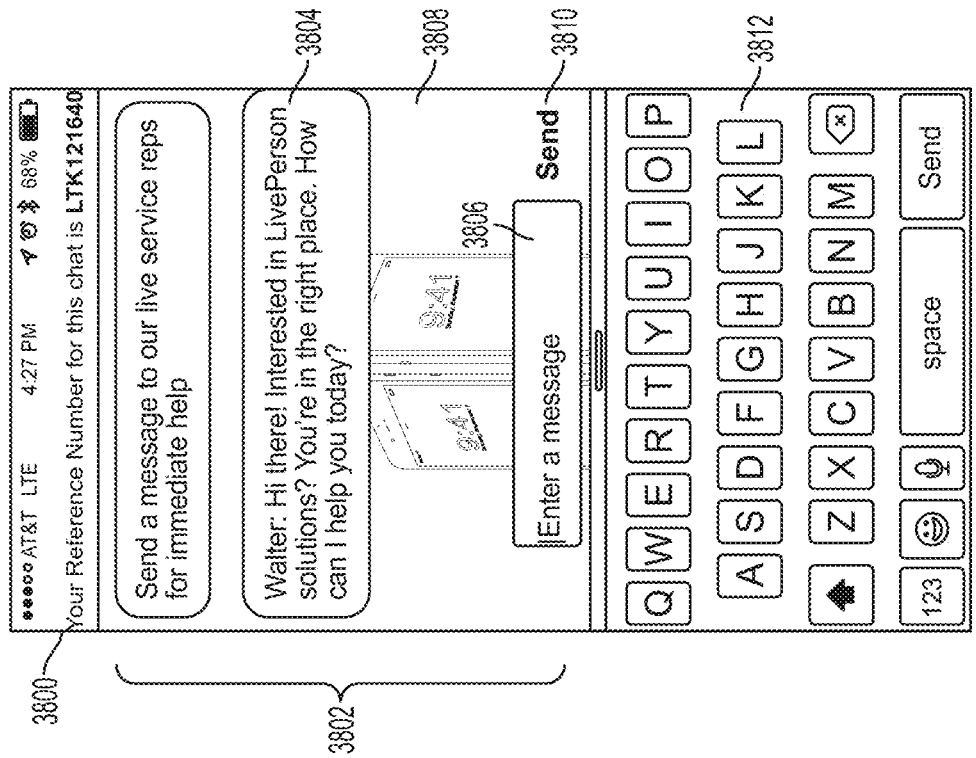
FIG. 37 is a depiction of a demonstration screen with a chat loading window displayable on a computing device according to one embodiment.
FIG. 38 is a depiction of a demonstration screen with a chat overlay displayable on a computing device according to one embodiment.

FIG. 37 is a depiction of a demonstration screen 3700 with a chat loading window 3702 displayable on a computing device according to one embodiment. The chat loading window 3702 can be displayed while the chat overlay 3802 is loading, which can correspond with the establishment of a chat connection. The chat loading window 3702 can be presented over the native app representation 3704.

FIG. 38 is a depiction of a demonstration screen 3800 with a chat overlay 3802 displayable on a computing device according to one embodiment. Upon loading the chat overlay 3802, the computing device can either establish a new chat connection or continue an already existing chat connection. The chat overlay 3802 can enable a user to interact with an agent through a live chat. The chat overlay 3802 can be presented over the native app representation 3808. The native app representation 3808 can be obscured as described above. The chat overlay 3802 can include a message bubble 3804 including information pertaining to the live chat, sent messages, or received messages. The chat overlay 3802 can further include a message box 3806 into which messages may be typed, as well as a send button 3810, which when pressed can cause the computing device to transmit any message typed into the message box 3806. A keyboard 3812 can be presented to allow a user to enter characters into the message box 3806.

Figure 39:
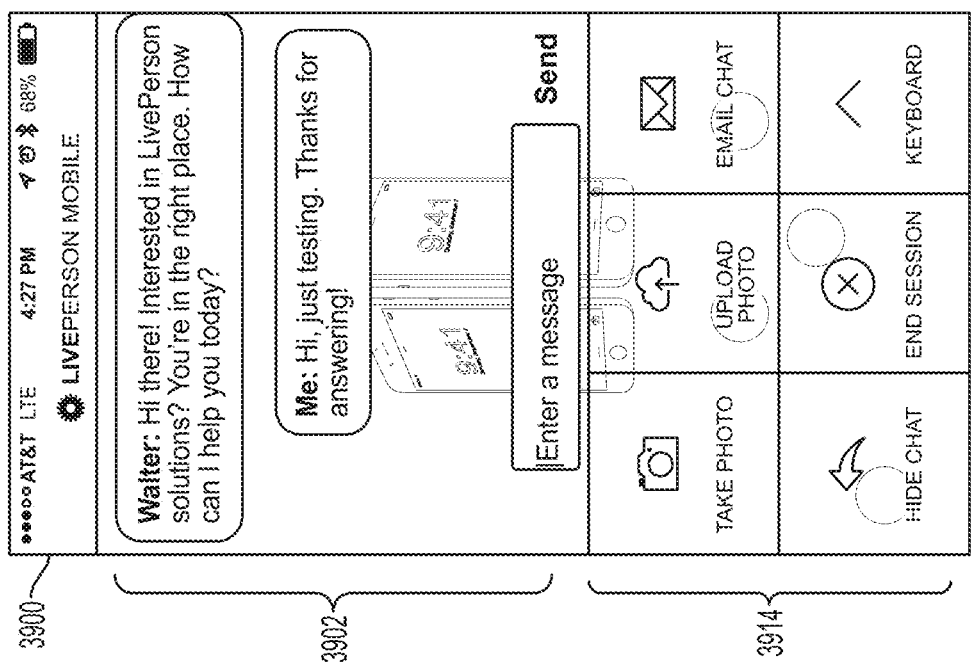
FIG. 39 is a depiction of a demonstration screen with a chat overlay displayable on a computing device according to one embodiment.

FIG. 39 is a depiction of a demonstration screen 3900 with a chat overlay 3902 displayable on a computing device according to one embodiment. In addition to the various elements described above with reference to demonstration screen 3800, demonstration screen 3900 can further include a function panel 3914. The function panel 3914 can be opened (e.g., may appear) in response by a suitable input by a user, such as swiping up on the touchscreen of the computing device from the bottom of the touchscreen. The function panel 3914 can include several buttons, each of which may cause the computing device to perform additional functions. Examples of additional functions include the ability to take a photo and attach it to the chat, the ability to choose an existing photo on the computing device to attach to the chat, the ability to generate an email transcript of the chat, the ability to hide the chat (e.g., dismiss the chat overlay 3902 without terminating the chat connection), the ability to end the session (e.g., dismiss the chat overlay 3902 and terminate the chat connection), and the ability to pull up the keyboard again, which may include hiding the function panel 3914. Other functions may be used.

Figure 40:
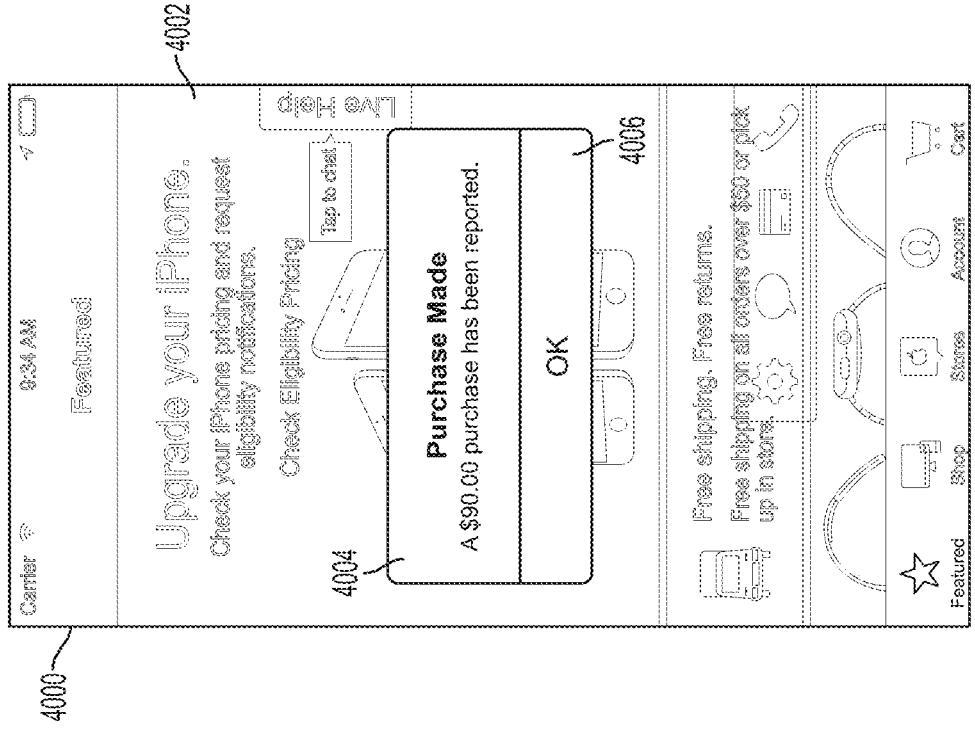
FIG. 40 is a depiction of a demonstration screen with an alert window displayable on a computing device according to one embodiment.

FIG. 40 is a depiction of a demonstration screen 4000 with an alert window 4004 displayable on a computing device according to one embodiment. The overlay element can include an alert window 4004 that may be presented to the user for a number of reasons. The alert window 4004 can be used to provide diagnostic feedback of the overlay element to a user of the demonstration application that would normally be accessible to the user through other means if the overlay element were integrated into the live webpage or native app. In FIG. 40, the alert window 4004 displays information that a purchase was made. The alert window 4004 of FIG. 40 may appear after a user selects the purchase button 3412 from FIG. 34. The alert window 4004 can include an accept button 4006, which when pressed can cause the computing device to dismiss the alert window 4004. When the alert window 4004 is displayed, the native app representation 4002 can be obscured.

The examples from FIGS. 15 and 26-40 refer to the demonstration of an overlay element (e.g., a live chat system, including a live chat tab, a chat overlay, and other supporting elements) with a graphical representation of a native app. It will be understood that in place of a graphical representation of a native app, a live native app can be presented if the operating system running on the computing device so allows. When a live native app is presented with the overlay element, the user can interact with both the live native app and the overlay element.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
   loading, via a native demonstration application executed using one or more processors of a mobile device, one or more graphical interfaces of a live website;
   generating, using the native demonstration application, a demonstration overlay element associated with the live website, wherein the demonstration overlay element is configured to modify the one or more graphical interfaces of the live website to add new interactive functionality to the live website;
displaying, on a touch-screen display of the mobile device, a live website screen including the one or more graphical interfaces of the live website;
receiving, at the mobile device, an input associated with the live website screen;
dynamically updating the live website screen to display a demonstration screen, wherein the demonstration screen includes the demonstration overlay element integrated with the live website;
facilitating a real-time communication between the mobile device and the live website using the demonstration overlay element; and
monitoring the real-time communication using the demonstration overlay element.

2. The computer-implemented method of claim 1, wherein the input is received at the touch-screen display of the mobile device and wherein the input includes one or more of a specific key combination, a specific swiping movement, or a multitouch input.

3. The computer-implemented method of claim 1, wherein the demonstration overlay element includes an interactive chat interface, and
wherein the demonstration screen further includes a user prompts to edit display settings corresponding to the interactive chat interface integration with the live website.

4. The computer-implemented method of claim 1, wherein the demonstration overlay element comprises a function bar that includes one or more of a call button for initiating a voice communication via the native demonstration application, a chat button for initiating a two-way text communication via the native demonstration application, and a demonstration application overlay button for configuring the native demonstration application.

5. The computer-implemented method of claim 1, wherein the input comprises a shake input received via an accelerometer of the mobile device.

6. The computer-implemented method of claim 1, wherein the demonstration overlay element includes a purchase button which when pressed causes the mobile device to simulate a purchase made via the live website.

7. The computer-implemented method of claim 1, wherein dynamically updating the live website screen includes accessing live setting information from local settings of the mobile device, and dynamically controlling functionality or appearance of the demonstration overlay element using the live setting information.

8. The computer-implemented method of claim 1, further comprising:
receiving an input associated with a conversation tracking switch via the native demonstration application, and
initiating monitoring the real-time communication based on the input.

9. The computer-implemented method of claim 1, wherein monitoring the real-time communication includes detecting non-responsiveness or extended latency to assess a quality of the communication exchange and to facilitate learning to update routing rules associated with the live website.

10. A mobile device comprising:
a memory; and
one or more processors coupled to the memory and configured to perform operations including:
loading, via a native demonstration application executed using the one or more processors of the mobile device, one or more graphical interfaces of a live website;
generating, using the native demonstration application, a demonstration overlay element associated with the live website, wherein the demonstration overlay element is configured to modify the one or more graphical interfaces of the live website to add new interactive functionality to the live website,
displaying, on a touch-screen display of the mobile device, a live website screen including the one or more graphical interfaces of the live website;
receiving, at the mobile device, an input associated with the live website screen;
dynamically updating the live website screen to display a demonstration screen, wherein the demonstration screen includes the demonstration overlay element integrated with the live website;
facilitating a real-time communication between the mobile device and the live website using the demonstration overlay element; and
monitoring the real-time communication using the demonstration overlay element.

11. The device of claim 10, wherein the input is received at the touch-screen display of the mobile device and wherein the input includes one or more of a specific key combination, a specific swiping movement, or a multitouch input.

12. The device of claim 10, wherein the demonstration overlay element includes an interactive chat interface; and
wherein the demonstration screen further includes a user prompts to edit display settings corresponding to the interactive chat interface integration with the live website.

13. The device of claim 10, wherein the demonstration overlay element comprises a function bar that includes one or more of a call button for initiating a voice communication via the native demonstration application, a chat button for initiating a two-way text communication via the native demonstration application, and a demonstration application overlay button for configuring the native demonstration application.

14. The device of claim 10, wherein the demonstration overlay element includes a purchase button which when pressed causes the mobile device to simulate a purchase made via the live website.

15. The device of claim 10, wherein dynamically updating the live website screen includes accessing live setting information from local settings of the mobile device, and dynamically controlling functionality or appearance of the demonstration overlay element using the live setting information.

16. A non-transitory computer-readable storage medium comprising instructions that, when executed by one or more processors of a mobile device, cause the mobile device to perform operations including:
loading, via a native demonstration application executed using the one or more processors of the mobile device, one or more graphical interfaces of a live website;
generating, using the native demonstration application, a demonstration overlay element associated with the live website, wherein the demonstration overlay element is configured to modify the one or more graphical interfaces of the live website to add new interactive functionality to the live website;
displaying, on a touch-screen display of the mobile device, a live website screen including the one or more graphical interfaces of the live website;

receiving, at the mobile device, an input associated with the live website screen; and dynamically updating the live website screen to display a demonstration screen, wherein the demonstration screen includes the demonstration overlay element integrated with the live website;

facilitating a real-time communication between the mobile device and the live website using the demonstration overlay element; and monitoring the real-time communication using the demonstration overlay element.

17. The non-transitory computer-readable storage medium of claim 16, wherein the input is received at the touch-screen display of the mobile device and wherein the input includes one or more of a specific key combination, a specific swiping movement, or a multitouch input.

18. The non-transitory computer-readable storage medium of claim 16, wherein the demonstration overlay element includes an interactive chat interface; and wherein the demonstration screen further includes a user prompts to edit display settings corresponding to the interactive chat interface integration with the live website.

19. The non-transitory computer-readable storage medium of claim 16, wherein the demonstration overlay element comprises a function bar that includes one or more of a call button for initiating a voice communication via the native demonstration application, a chat button for initiating a two-way text communication via the native demonstration application, and a demonstration application overlay button for configuring the native demonstration application.

20. The non-transitory computer-readable storage medium of claim 16, wherein the demonstration overlay element includes a purchase button which when pressed causes the mobile device to simulate a purchase made via the live website.

* * * * *